(12) United States Patent
Yasui et al.

(10) Patent No.: US 7,384,555 B1
(45) Date of Patent: Jun. 10, 2008

(54) PROCESS FOR BIOLOGICAL TREATMENT OF AQUEOUS ORGANIC WASTES

(75) Inventors: Hidenari Yasui, Tokyo (JP); Masahide Shibata, Tokyo (JP)

(73) Assignee: Kurita Water Industries Ltd., Tokyo (JP)

( * ) Notice: Subject to any disclaimer, the term of this patent is extended or adjusted under 35 U.S.C. 154(b) by 0 days.

(21) Appl. No.: 08/309,868

(22) Filed: Sep. 21, 1994

(30) Foreign Application Priority Data

| | | |
|---|---|---|
| Sep. 22, 1993 | (JP) | ................................. 5-236533 |
| Sep. 27, 1993 | (JP) | ................................. 5-240088 |
| Sep. 27, 1993 | (JP) | ................................. 5-240089 |
| Oct. 22, 1993 | (JP) | ................................. 5-265227 |
| Feb. 23, 1994 | (JP) | ................................. 6-025626 |
| Jun. 23, 1994 | (JP) | ................................. 6-141956 |
| Jul. 8, 1994 | (JP) | ................................. 6-157404 |

(51) Int. Cl.
  *C02F 3/00* (2006.01)
(52) U.S. Cl. ..................... 210/605; 210/607; 210/627
(58) Field of Classification Search ................ 210/605, 210/607, 609, 614, 620, 627, 630, 631, 908, 210/760; 435/262, 262.5
  See application file for complete search history.

(56) References Cited

U.S. PATENT DOCUMENTS

| | | | | |
|---|---|---|---|---|
| 3,235,487 A | * | 2/1966 | Westgarth ................... 210/605 |
| 3,236,766 A | * | 2/1966 | Levin ........................ 210/625 |
| 3,300,402 A | * | 1/1967 | Grich et al. ................ 210/625 |
| 3,591,491 A | * | 7/1971 | Smith et al. | |
| 3,772,188 A | | 11/1973 | Edwards ...................... 210/15 |
| 4,136,023 A | * | 1/1979 | Kirk et al. ..................... 210/7 |
| 4,178,239 A | * | 12/1979 | Lowther ...................... 210/15 |
| 4,200,524 A | * | 4/1980 | Levin ........................ 210/616 |
| 4,225,431 A | * | 9/1980 | De Longe ................... 210/617 |

(Continued)

FOREIGN PATENT DOCUMENTS

CH  521 293  4/1972

(Continued)

OTHER PUBLICATIONS

Brock, T.O., Biology of Microorganisms, Prentice Hall,Inc , NJ, 1970 , pp. 202-204 and 214 and 215.*

(Continued)

*Primary Examiner*—Chester T Barry
(74) *Attorney, Agent, or Firm*—Flynn, Thiel, Boutell & Tanis, P.C.

(57) ABSTRACT

A process and an apparatus for an aerobic biological treatment of aqueous organic wastes, in which the aqueous organic waste is supplied to an aeration tank for an aerobic biological treatment in the presence of a biosludge composed essentially of aerobic microorganisms. The aerated aqueous suspension in the aeration tank is subjected to solid/liquid, separation, the so-separated liquid phase is removed as treated water, at least a portion of the separated sludge is recycled to the aeration tank, a part of the aqueous suspension in the aeration tank or of the separated sludge is treated with ozone at a pH of 5 or lower, and the ozonized suspension or sludge is recycled to the step of aerobic biological treatment. The biosludge is transformed into BOD components using a decreased amount of ozone to thereby decrease the amount of excess sludge and, in some cases, even reduce it to zero.

8 Claims, 12 Drawing Sheets

U.S. PATENT DOCUMENTS

| | | | | |
|---|---|---|---|---|
| 4,370,235 | A | * | 1/1983 | Suzuki et al. ............... 210/620 |
| 4,487,699 | A | * | 12/1984 | Long, Jr. ..................... 210/760 |
| 4,834,872 | A | | 5/1989 | Overath ....................... 210/151 |
| 4,936,983 | A | * | 6/1990 | Long et al. ................. 210/218 |
| 5,215,554 | A | * | 6/1993 | Kramer et al. ................. 55/16 |
| 5,362,395 | A | * | 11/1994 | Dorau et al. ................ 210/638 |
| 5,484,549 | A | * | 1/1996 | Hei et al. .................... 252/103 |
| 5,520,888 | A | * | 5/1996 | Berndt .................. 422/186.08 |
| 6,086,766 | A | * | 7/2000 | Yasui ......................... 210/625 |

FOREIGN PATENT DOCUMENTS

| | | | |
|---|---|---|---|
| FR | 2 490 208 | | 3/1982 |
| FR | 2668765 | * | 5/1992 |
| GB | 1 417 573 | | 12/1975 |
| JP | 7019100 | * | 2/1982 |
| JP | 360118299 A | * | 6/1985 |
| JP | 5-23688 | | 7/1991 |
| JP | 404225900 A | * | 8/1992 |

OTHER PUBLICATIONS

Sotelo et al., Ind. Eng. Chem. Res. 1987, 26 pp. 39-43.*
Patent Abstract of Japan—JP-A-04 298 290, published Oct. 1992, vol. 17, No. 113 (Matsushita Electric).
Patent Abstract of Japan—JP-A-61 129 094, published Jun. 1986, vol. 10, No. 318 (Nitto Electric Ind. Co. Ltd.).
Patent Abstract of Japan—JP-A-01 293 103, published Nov. 1989, vol. 14, No. 74 (Kurita Water Ind. Ltd.).

* cited by examiner (a)    (b)

PROCESS FOR BIOLOGICAL TREATMENT OF AQUEOUS ORGANIC WASTES

FIELD OF THE INVENTION

The present invention relates to a process for an aerobic biological treatment of aqueous organic wastes in an aeration tank in the presence of a biosludge composed essentially of aerobic microorganisms and to an apparatus to be used therefor, in which the amount of excess sludge in the aerobic biotreatment system can be reduced.

BACKGROUND OF THE INVENTION

An aerobic biological treatment of aqueous wastes by biodegradation of the organic substances in the waste using aerobic microorganisms, such as the so-called activated sludge treatment, permits a low cost operation with a superior treatment performance and has found a wide use. It suffers, however, from a problem of the occurrence of a large amount of "excess sludge" formed in accompaniment with such an aerobic biological treatment, which is difficult to dewater up to a degree permitting easy disposal or further processing thereof. The excess sludge formed during the biological treatment may amount to about 30-60% by weight of the biolyzed BOD in the treated waste, so that the disposal thereof brings about a practical problem. Heretofore, such an excess sludge has been disposed by depositing it in a landfill. In practice, it becomes more and more difficult to reserve such a landfill site, so that it is required to develop a technique for reducing the amount of the excess sludge to be formed.

To achieve such a reduction of excess sludge formation, it has generally been practiced to employ a biological digestion of the excess sludge formed in a conventional aerobic biological treatment of aqueous wastes, either under an aerobic or an anaerobic condition. This is accomplished by installing a biosludge digestion unit separately from the aerobic biological treatment apparatus for aqueous organic waste, in which the digestion of the biosludge is effected under an aerobic or anaerobic condition.

Such a practice provides a decomposition of the biosludge only up to a proportion of about 50% thereof, with the remainder of about 50% being discharged out of the system as a so-called "digested sludge" which is impervious to biological attack and should be disposed by incineration or burial.

In Japanese Patent Application Kokai Nos. 8835/1980, 105897/1984, 112899/1984 and 222798/1990, a technique for treating an excess sludge by first subjecting it to an oxidative decomposition by ozone and, then, biologically digesting the remaining sludge under an aerobic or anaerobic condition is disclosed and it is taught that the performance of reduction of the excess sludge amount is increased or the requisite digestion time can be decreased by the ozone treatment.

In these conventional techniques, however, an ozone treatment is employed for transforming the biosludge into BOD, so that a problem still remains in that a large amount of ozone is required for sufficient transformation of the biosludge into BOD.

Japanese Patent Application Kokai No. 206088/1994 discloses a technique for an aerobic biological treatment of aqueous organic wastes in which the biosludge is subjected to an aerobic biodegradation after it has been pretreated by an oxidative decomposition with ozone, whereby the reduction in the excess sludge amount is increased and, in some cases, even a complete elimination of the occurrence of excess sludge can be achieved. However, this Kokai does not disclose an ozone treatment carried out at an acidic pH condition of 5 or below.

SUMMARY OF THE INVENTION

An object of the present invention is to obviate the above-mentioned problems and to provide a process and an apparatus for an aerobic biological treatment of aqueous organic wastes, which enables the achievement of an efficient reduction of the amount of excess sludge by attaining an ozone-decomposition of the biosludge using a decreased amount of ozone to increase the biodegradability of the sludge.

The second object of the present invention is to provide a process and an apparatus for an aerobic biological treatment of aqueous organic wastes, which enables the reduction of the amount of excess sludge using a decreased amount of ozone and to improve the performances in the settling and the dewatering of the formed sludge.

The third object of the present invention is to provide a process and an apparatus for an aerobic biological treatment of aqueous organic wastes, which enables the reduction of the amount of excess sludge using a decreased amount of ozone and to achieve a membrane separation of the sludge and water at a high permeation flux.

The fourth object of the present invention is to provide a process and an apparatus for an aerobic biological treatment of aqueous organic wastes, which enables the reduction of the amount of excess sludge using a decreased amount of ozone, to prevent an obstructive effect due to bubbling during the ozone treatment and to achieve the ozone treatment of the biosludge in a compact and small-sized unit.

The fifth object of the present invention is to provide a process and an apparatus for an aerobic biological treatment of aqueous organic wastes, which enables the reduction of the amount of excess sludge using a decreased amount of ozone and to achieve a more efficient ozone treatment of the biosludge at a low cost.

The process for a biological treatment of aqueous organic wastes according to the present invention is based on an aerobic biological treatment of the aqueous organic waste in an aeration tank in the presence of a biosludge composed essentially of aerobic microorganisms, comprising a step of aerobic biological treatment realized by subjecting the aqueous organic waste supplied to the aeration tank to an aerobic biological treatment in the presence of a biosludge composed essentially of aerobic microorganisms, a step of solid/liquid separation realized by subjecting the aerated aqueous suspension in the aeration tank to solid/liquid separation, removing the so-separated liquid phase as the treated water and recycling at least a portion of the separated sludge to the aeration tank, and a step of ozone treatment realized by treating a part of the aqueous suspension in the aeration tank or of the separated sludge with ozone at a pH of 5 or lower and recycling the ozonized suspension or sludge to the step of aerobic biological treatment.

The apparatus for realizing the biological treatment of aqueous organic wastes according to the present invention comprises an aerobic biological treatment unit for subjecting the aqueous organic waste supplied to the aeration tank to an aerobic biological treatment in the presence of a biosludge composed essentially of aerobic microorganisms, a solid/liquid separation unit for subjecting the aerated aqueous suspension in the aeration tank to solid/liquid separation, removing the so-separated liquid phase as the treated water and recycling at least a portion of the separated sludge to the aeration tank, and an ozone treatment unit for treating a part of the aqueous suspension in the aeration tank or the separated sludge with ozone at a pH of 5 or lower and recycling the ozonized suspension or sludge to the aerobic biological treatment unit.

DETAILED DESCRIPTION OF THE INVENTION

Figure 1:
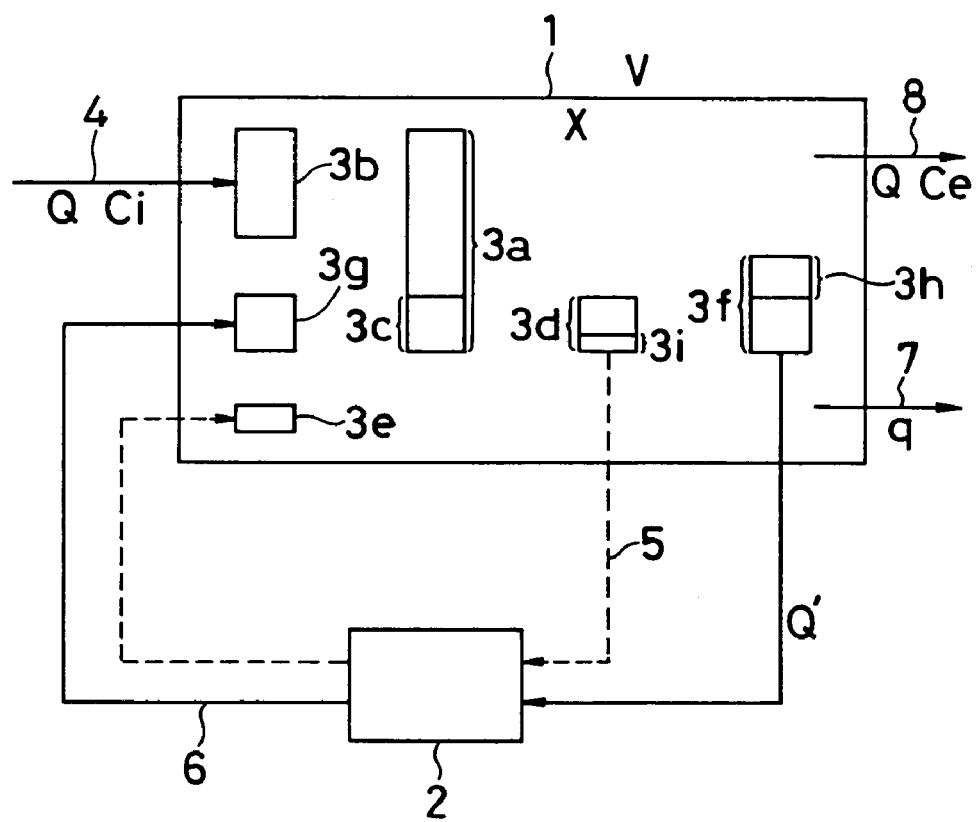
FIG. 1 is a schematic flow diagram explaining the principle of the technique of reduction of the amount of excess sludge according to the present invention.

The aqueous organic wastes to be treated according to the present invention include every aqueous liquid or slurry which contains organic substances capable of being subjected to biodegradation by a biosludge composed essentially of aerobic microorganisms and which may also contain some other difficultly biodegradable organic substances and even inorganic substances. Examples of such aqueous organic wastes include sewage, excrement, waste liquors from food and drink manufacturing factories and various industrial aqueous wastes.

According to the present invention, such an aqueous organic waste as mentioned above is treated biologically by a biosludge composed essentially of aggregated cells of aerobic microorganisms under an aerobic condition. For such a biological treatment, an aerobic biological treatment by a conventional activated sludge treatment is employed, which comprises the steps of bringing the aqueous organic waste into contact with an activated sludge in an aeration tank under aeration, subjecting the resulting aqueous suspension to a solid/liquid separation in a solid/liquid separation unit and recycling a part of the separated biosludge to the aeration tank. Modifications of such procedures may also be employed.

The aerobic biological treatment includes, in the context of the present invention, also a biological nitrogen removal process which comprises the steps of biological nitrification and denitrification, instead of or in addition to the BOD removal step.

According to the present invention, a part of the biosludge is extracted from the treating system and the extracted biosludge is subjected to an ozone treatment under an acidic condition of a pH of 5 or below. While it is preferable to effect the ozone treatment for an extracted sludge from the solid/liquid separation unit, it may be permissible to realize it for an extracted aqueous suspension from the aeration tank. When the ozone treatment is realized for the extracted sludge from the solid/liquid separation unit, the ozone treatment may be effected for the whole or a part of the excess sludge exhausted from the solid/liquid separation unit. However, it is more preferable that a part of the sludge to be recycled to the aeration tank, be extracted from the recycling line and is subjected to the ozone treatment together with the excess sludge. By this, the amount of excess sludge can further be reduced and even the complete elimination of the excess sludge can be achieved depending on each specific condition, for which a further detailed description will be given afterwards.

The pH control may be attained preferably by adding an inorganic acid, such as sulfuric acid, hydrochloric acid or nitric acid, as a pH controlling agent, to the aqueous suspension of biosludge or by acidogenesis by an anaerobic biological treatment of the biosludge or, further, by a combination of them. When using the pH controlling agent, it is preferable to adjust the pH value to 3-4. When acidogenesis by an anaerobic biological treatment is employed, a pH of 4-5 may preferably be adjusted.

The acidogenesis occurs in an anaerobic biological treatment of an aqueous biosludge suspension similar to the conventional practice of organic acid-forming anaerobic sludge digestion. The extracted sludge can be subjected to the anaerobic biological treatment as such or, if necessary, after a suitable pretreatment by thickening or so on. The step of acidogenesis is carried out in the presence of a group of anaerobic bacteria containing acid-forming bacteria while maintaining the biosludge under an anaerobic condition. In this anaerobic biological treatment, the biosludge is biolysed and transformed into BOD, wherein the organic substances in the biosludge are converted into organic acids, such as acetic acid, propionic acid, butyric acid and lactic acid, to lower the pH value of the sludge.

After the anaerobic biological treatment has succeeded for a prolonged period of time, the biological condition may often change to methane fermentation. It is thus preferable to maintain the condition of the anaerobic biological treatment as long as possible so methane fermentation does not occur.

The biological condition in the anaerobic biological treatment may preferably be at a temperature of 25° C. or higher, preferably 35-40° C., with a residence time of at least 3 hours, preferably 6-24 hours, though different conditions may be possible depending upon each specific condition of the aerobic biological treatment and the nature of the aqueous organic waste to be treated and so on. It is important to maintain an anaerobic condition in the biological treatment system. It is preferable to keep, as a parameter of the anaerobic condition, a redox potential (ORP) of −50 mV or lower.

The ozone treatment can be carried out by bringing the extracted sludge or the resulting suspension from the step of acidogenesis as such or, if necessary, after it has been concentrated by, for example, a centrifuge, into contact with ozone at a pH of 5 or lower. For this, various techniques may be employed, for example, blowing ozone into an ozone-treating vessel supplied with the biosludge suspension, mechanically mixing ozone with the biosludge suspension, contacting ozone with the biosludge suspension in a packed column and so on.

Any ozone-containing gas, such as ozone gas itself, ozone-containing air, ozonized air, may be used as the ozone source. The ozone supply rate, or ozone dose, may be in the range from 0.002 to 0.05 gram of $O_3$ per gram of VSS (volatile suspended solids), preferably from 0.005 to 0.03 g-$O_3$/g-VSS. By the ozone treatment, the biosludge is oxidatively decomposed into BOD components, namely, aerobically biodegradable organic substances.

For the ozone treatment, an apparatus of any construction may be used, provided that it comprises an ozonization vessel, capable of causing the biosludge suspension to contact with ozone at a pH of 5 or below to effect an oxidation of the biosludge, and a means for recycling the ozonized suspension to the aeration tank. In the case where the sludge particles tend to settle in the ozonization vessel or where the amount of the sludge particles settling down in the vessel surpass the amount of the sludge particles floating up in the vessel, it is preferable to effect the contact of the biosludge suspension with ozone on the principle of parallel flow, whereby the ozone-contacting efficiency is increased. On the other hand, in the case where the sludge particles tend to float up in the vessel or where the sludge particles floating up prevail over those settling down, the ozone-contacting should preferably be effected on the principle of counter flow, whereby the ozone-contacting efficiency is increased.

Upon blowing the ozone-containing gas into the ozonization vessel, a foaming of the liquid phase may occur. In order to exclude any hindering effect due to the foaming, a liquid spraying means for preventing the foaming may be installed within the ozonization vessel.

For the liquid spraying means, it is convenient to provide the ozone treatment unit with a means for spraying the sludge suspension extracted from the ozonization vessel onto the liquid surface of the ozonization vessel. In the case where the sludge particles tend to settle down in the ozonization vessel or where the sludge particles settling down in the vessel prevail over those floating up, it is preferable to extract the sludge suspension in the ozonization vessel at a lower portion thereof, whereby the ozone-contacting efficiency increases. On the other hand, in the case where the sludge particles tend to float up in the vessel or where the sludge particles floating up prevail over those settling down, it is preferable to extract the sludge suspension in the ozonization vessel at an upper portion thereof, whereby the ozone-contacting efficiency is increased.

In practice, spraying of a suspension is, in general, avoided, due to a possibility of clogging or blocking of the spray nozzle by the suspended solids. However, it has been confirmed by the inventors that spraying with the biosludge suspension employed in the ozone treatment system did not cause any clogging nor blocking of the spray nozzle by the sludge particles but rather had an advantageous effect that the adhering tendency of the cells of microorganisms onto solid surfaces was reduced due to the atomization of the biosludge.

Employment of the sludge suspension in the ozonization vessel for the spraying liquid for preventing the foaming does avoid any increase in the amount of the reaction medium in the ozonization vessel, as may be the case when using water therefor, thus contributing to the compact design of the ozone treatment unit. By the liquid spraying over the liquid surface in the vessel, agitation and circulation of the liquid phase within the vessel are facilitated, whereby settling and floating up of the sludge particles are prevented with an effect of increasing the ozone-contacting efficiency and, thus, the total reaction efficiency of the ozone treatment unit. In practice, mixing of the liquid layer in an upper portion of a gas/liquid contacting vessel with the liquid layer in an lower portion thereof is avoided, since the concentration gradient along the height of the vessel will be lowered thereby. In case, however the ozone-contacting is not directed to a gas/liquid contact but is directed to a gas/solid contact like a biosludge, agitation of the sludge suspension will increase the efficiency of ozone treatment.

The ozone treatment efficiency will further increase by employing an ozonization vessel constructed in such a manner that it comprises a liquid contacting zone disposed in the lower part of the vessel, into which the ozone-containing gas is blown to effect the gas/liquid contact, and a foam contacting zone disposed in the upper part of the vessel, in which the gas/liquid contact is effected between the ozone-containing gas and the thin liquid films of bubbles in the foam layer formed above the biosludge suspension level of the liquid contacting zone. Here, the height of the liquid contacting zone may be in the range of 0.2-3 meters, preferably in the range of 0.5-1.5 meters. A height of the foam contacting zone of 1 meter above the sludge suspension level of the liquid contacting zone may be sufficient, while it may preferably be in the range of 1-10 m and more preferably in the range of 2-5 m.

It is preferable to maintain the height of the liquid contacting zone at a constant value. This can be achieved by, for example, providing the ozonization vessel with a sludge suspension exhaustion means in the form of an over-flow weir at a middle or lower portion thereof. The foam contacting zone may be built up preferably in the space above the sludge suspension level of the liquid contacting zone (namely, the level of the exhaustion means).

The foam contacting zone may be furnished with a foam layer supporting element, in order to maintain the foam layer efficiently and, thus, to increase the ozone treatment efficiency, even in the case where the maintenance of the foam layer is not easy due to the large-sized foam or where the foaming of the biosludge suspension is not easy due to the low concentration of the biosludge. As the foam layer supporting element, those having a construction effective for maintaining the foam layer may preferably be employed, such as a lattice screen or a honeycomb plate with partition frames.

The ozonization vessel may be provided, above the foam contacting zone, with a means for spraying a liquid onto the surface of the foam layer, in order to suppress superfluous foaming and to maintain the desired thickness of the foam layer. For the spray liquid, an industrial water, the final treated water, sludge suspension extracted from the ozonization vessel and mixture of this extract with the starting aqueous waste to be treated may be used. Here, it is preferable to use the sludge suspension extracted from the ozonization vessel or the mixture of this extract with the starting aqueous waste, since no decrease in the biosludge concentration in the reaction mixture of the ozonization vessel occurs. Use of only the starting aqueous organic waste as the spraying liquid will easily cause a clogging or blocking of the spray nozzle and is not desirable. However, use of the mixture of the sludge suspension extracted from the ozonization vessel with the starting aqueous waste will hardly cause clogging or blocking of the spray nozzle, since the aqueous waste is diluted by the ozonized suspension.

The ozonization vessel mentioned above can be constructed having a lower mechanical strength as compared with an ozonization vessel to be filled completely with the sludge suspension, since the foam contacting zone thereof is filled up only with a bubble layer, so that it requires a lower investment costs.

In the ozonization vessel, the biosludge is reacted with ozone and is oxidatively decomposed into BOD components. By the ozonization, the viscosity of the sludge suspension increases and becomes a liquid exhibiting a high tendency to foam, which will foam up easily, when brought into contact with ozone-containing gas, to build up a foam layer.

By carrying out the ozone treatment under formation of such a foam layer, the contact of ozone with the sludge particles is effected not only in the liquid contacting zone but also, in addition thereto, in the foam contacting zone in which the contacting efficiency is high due to the intimate gas/liquid film/gas contact, so that the over-all efficiency of ozone treatment is higher than the case of using only the liquid contacting zone. However, if the gas/liquid contact is effected only through the foam layer, a phenomenon of so-called channeling will often occur and the gas will pass through without effective contact. By first passing the liquid contacting zone, the ozone-containing gas is divided into fine bubbles to increase the contacting efficiency and to establish the foaming layer.

Employment of the foaming layer supporting element in the foaming contacting zone facilitates stabilization of the foaming layer and can maintain the foaming layer stably even in the case of a large diameter of the ozonization vessel where maintenance of the foam layer is intrinsically not easy or in the case of a sludge suspension exhibiting poor foamability, whereby an efficient ozone treatment can be attained by holding an adequate height of the foam layer.

The foaming technical measures may facilitate the effective operation of the ozone treatment unit due to the capability of better maintenance and control of the foam layer:

a) When the biosludge content in the sludge suspension is adjusted to 2,000-20,000 mg/l, preferably to 5,000-15,000 mg/l, a foam layer height of 1 meter or more can be maintained by adequately choosing the foam conditions, such as an ozone dose, spraying flow rate, use of the foam layer supporting element etc.

b) When the foam layer support element is arranged in the foam contacting zone on the ozonization vessel, maintenance of the foam layer is made easy.

c) When a liquid spray is employed by installing a liquid spraying means above the foam contacting zone in the ozonization vessel, control of the foam layer height is made easy.

d) When the sludge suspension in the ozonization vessel is employed as a part of the spray liquid for the liquid spray means, easy control of the foam layer height can be attained with efficient utilization of ozone.

According to the present invention, the sludge suspension, before or after passing the ozone treatment, is preferably heated as such or, if necessary, after having been concentrated by, for example, a centrifuge.

For this heat treatment, the sludge suspension, before or after passing the ozone treatment, may be supplied to a heat treatment vessel and is heated there by steam or an electric heater, while other techniques may be applicable. Heating may preferably be effected at a temperature of 50-100° C., preferably 60-90° C., for 0.1-2 hours, preferably 0.5-1 hour. If heating is carried out at a temperature above 100° C., a difficultly removable coloring component may be formed, so that such a condition is not desirable. The heat treatment may be carried out before or after, or both before and after the ozone treatment.

By the heat treatment, the amount of ozone necessary for attaining the same degree of reduction of the excess sludge amount can be decreased as compared with the case of using only the ozone treatment. This is believed to be due to a synergistic effect of the effect of lowering of the molecular weight by the hydrolysis of the bacterial substances and high-polymeric substances in the extracted sludge suspension by the ozone treatment and the effect of increasing the biodegradability due to the decomposition of the sludge and organic matter by the heat treatment.

The sludge suspension which has been ozonized or, in addition thereto, further heat-treated is returned to the step of aerobic biological treatment as such or, if necessary, after having been processed, for example, by thickening etc., subjected to aerobic biological treatment. Here, it is possible also to carry out the aerobic biological treatment by supplying the sludge suspension to an aerobic biological treatment unit arranged separately from the aeration tank, though the recycling of the sludge suspension to the aeration tank is preferred. In an aerobic biological treatment system employing a biological nitrification step with nitrifying bacteria and a biological denitrification step with denitrifying bacteria, the sludge suspension may be recycled to the biological denitrification step.

By the ozone treatment, a small amount of a BOD component difficult to be biodegraded is usually formed. However, such a difficultly biodegradable BOD component can be decomposed by, for example, disposing supporting bodies of spongy material in the aeration tank to extend the SRT by supporting the biosludge thereon.

By the aerobic biological treatment of the ozonized sludge suspension, organic matter contained in the suspension is removed easily by biodegradation, whereby the amount of the excess sludge to be exhausted from the entire system is decreased. Here, the larger the amount of the sludge to be ozonized, the higher the rate of reduction of the sludge amount will be. While the amount of excess sludge cannot be reduced to reach zero, because of the multiplication of the biosludge upon the biodegradation of organic matter in the ozonized biosludge, the over-all amount of excess sludge formed in the entire system can be reduced to zero, when the superfluous amount of biosludge is extracted from the aeration tank so as to make the apparent multiplicating amount of the biosludge to be zero. Here, the biological treatment performance may sometimes be decreased by increasing the amount of the biosludge to be treated. In such a case, the biological treatment performance can be maintained at a high level, by arranging supporting bodies in the aeration tank for supporting the biosludge thereon so as to keep a definite amount of the biosludge.

Figure 16:
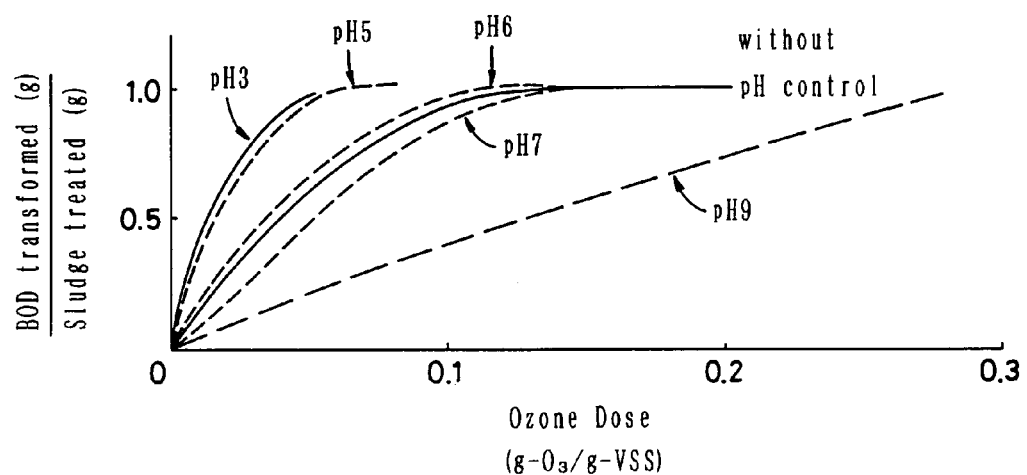
FIGS. 16 and 17 are graphs representing the experimental results of Example 4.

According to the present invention, by ozone treatment at a pH of 5 or lower, the amount of ozone consumption can be decreased to about ½-⅓ of the amount necessary in the practice without pH control. FIG. 16 is a graph representing the experimental results of Example 3 appearing afterwards, from which it is indicated that the ozone dose (proportion of the amount of ozone supplied to the amount of the biosludge in g-$O_3$/g-VSS) should be set at about 0.1 for the case of without pH control (pH 6-7), in order to achieve an effect of the ozone treatment, since the ratio of the amount of BOD formed relative to the amount of the biosludge to be treated (BOD formation rate) is low at lower ozone doses, whereas, in the case where the pH is adjusted to 5, it is enough to set the ozone dose at 0.05, in order to attain the same BOD formation rate, so that the requisite amount of ozone is lowered to ½.

While the reason for the permission of lower amounts of ozone to be used by adjusting the pH value of the sludge suspension during the ozone treatment at 5 or below is not clear, it is assumed as follows:

A biosludge is composed of slime materials and cell walls consisting mainly of polysaccharides and of cytoplasms composed mainly of proteins. Among them, proteins are most susceptible to biodegradation and polysaccharides are most difficult to be subjected to biodegradation due to their solid consistency. When such a biosludge is subjected to an ozone treatment, the polysaccharides may decompose oxidatively into BOD components, so that the cells are destroyed and the proteins flow out and become subject to reaction with the ozone. When proteins react with ozone, an excessive amount of ozone is required for the complete transformation of the polysaccharide into BOD components, since the proportion of ozone reacted with the polysaccharides decreases correspondingly. If, at this point of time, the ozone treatment is carried out at a pH of 5 or lower, the reaction of ozone with proteins will be retarded due to a possible coagulation of the proteins in the acidic medium. Thus, the proportion of the reaction of ozone with the polysaccharides is increased with the result that more polysaccharides are oxidatively decomposed at a lower ozone dose.

In the process according to the present invention, a concentrated sludge suspension separated in a membrane separation unit may be subjected to the ozone treatment, instead of ozone-treating the sludge separated in the solid/liquid separation unit. For the membrane separation unit, those having a voluntary separation membrane, such as an ultrafiltration (UF) membrane, a microfilteration (MF) membrane or a reverse osmosis (RO) membrane, may be employed. Among them, a UF membrane and an MF membrane are preferred. The membrane separation unit may be disposed either within or outside the aeration tank. By membrane separation, the biosludge and other solid matters are concentrated on the concentrate side of the membrane and the permeated water can be reused as the treated water.

In practicing the process according to the present invention using the membrane separation unit, any blocking of the membrane is avoided and a high permeation flux is maintained, since the biosludge and other solid matters are converted into BOD components by the ozone treatment, which are then decomposed by the aerobic microorganisms in the biosludge in the aeration tank.

Also, by the process according to the present invention, reduction of the amount of excess sludge can be attained while preventing any decrease in the performance of the biological treatment with a simultaneous improvement of the sedimentation property and dewaterability of the biosludge in the aeration tank, by controlling the amount of sludge to be supplied to the ozone treatment and the amount of excess sludge exhausted out of the system so as to maintain the VSS/SS ratio and the MLVSS value at each predetermined value. By this, the operation of the solid/liquid separation unit is made easy and the dewatering of the separated excess sludge can be performed easily.

Thus, the sedimentation property and the dewatering performance can be improved by controlling the operation in such a manner that the VSS/SS ratio of the biosludge in the aeration tank is maintained at 0.2-0.7, preferably 0.3-0.6 and the MLVSS is maintained at 500-10,000 mg/l, preferably 1,000-5,000 mg/l. As a general trend, the lower the VSS/SS ratio, the higher the density of the biosludge will be, whereby the sedimentation property and the dewatering performance are improved.

By employing the ozone treatment, the biosludge is transformed into BOD components which are susceptible to biometabolism of the microorganisms in the aeration tank when transferred thereto and converted into $CO_2$, which is discharged out of the system to the atmosphere. The VSS/SS ratio decreases with an increase in the amount of $CO_2$ exhausted out of the system. Therefore, the larger the amount of sludge supplied to the ozone treatment, the lower the VSS/SS ratio will be and the sedimentation property and the dewatering performance of the sludge are thereby improved.

If the amount of the sludge to be treated is large, the performance of the aerobic biological treatment decreases due to the decrease of the VSS. Here, if the amount of excess sludge to be discharged is chosen to be smaller, the MLVSS will increase and the biosludge will be retained in the tank in an amount requisite for aerobic biological treatment.

Between the rate of reduction of the amount of organic sludge and the VSS/SS ratio of the biosludge, there is a relationship that the higher the amount of the organic sludge to be chosen in the operation, the lower will be the VSS/SS ratio. The relationship between them is shown in Table 1 below at a BOD of the sludge to be treated of 100 mg/l, a rate of sludge conversion of 0.4 g-VSS/g-BOD and a concentration of the inorganic SS in the sludge suspension to be treated of 10 mg/l.

TABLE 1

| Rate of Reduction Of Org. Sludge (%) | VSS/SS Ratio of Activ. Sludge |
| --- | --- |
| 0 | 0.80 |
| 50 | 0.67 |
| 80 | 0.44 |
| 100 | 0 |

While it is seen from Table 1 that the VSS/SS ratio at 100% reduction of the organic sludge amount is zero, in practice, an aerobic biological treatment cannot be maintained at zero VSS, so that an adequate rate of reduction of the organic sludge amount should be present actually. Such an adequate rate of reduction of the organic sludge amount is decided by taking into account the VSS concentration and the VSS/SS ratio in the aeration tank. In the case shown in Table 1, a treating operation to attain an organic sludge reduction rate (rate of reduction of the organic sludge amount) of 50-80% will improve the sedimentation property and dewatering performance of the resulting sludge.

Also, for an aqueous sludge suspension having an SS/BOD ratio different from the embodiment given above, a contemplated VSS/SS ratio can be attained by selecting an adequate organic sludge reduction rate. In case no inorganic SS is present in the aqueous organic waste to be treated, addition of an inorganic SS component, such as sand, zeolite or an inorganic flocculant, in a fairly small amount may be incorporated.

Below, the principle of the reduction of the biosludge amount according to the present invention is explained with reference to the pertaining Figures appended.

FIG. 1 is a schematic flow diagram explaining the principle of the technique of reduction of the biosludge amount, in which 1 is an aerobic biological treatment system and 2 is an ozone treatment system. The aerobic biological treatment system 1 serves for aerobic treatment of the aqueous organic waste by contacting the waste with a biosludge, in which an aeration tank and a solid/liquid separation unit are arranged separately from each other. The ozone treatment system 2 reacts a sludge suspension, which is extracted in a form of mixture or in a concentrated form, with an ozone-containing gas to cause an oxidative decomposition of the biosludge and organic matter into BOD components.

In the aerobic biological treatment system 1 shown in FIG. 1, a certain amount of a biosludge 3$a$ is maintained for realizing an aerobic treatment of the waste. When an aerobic biological treatment is effected by supplying the system 1 with the aqueous waste 4 to be treated, the BOD components contained in the aqueous waste 4 are anabolized in the biosludge 3$a$ and a newly grown biosludge 3$b$ is formed by the multiplication of the sludge 3$a$. On the other hand, the biosludge 3$a$ present in the system 1 is subjected to an autolysis and loses an autolysis decrement 3$c$. Therefore, in the steady state, the difference between the grown biosludge 3$b$ and the autolysis decrement 3$c$ remains as the multiplication increment 3$d$.

In the conventional technique of biosludge reduction, this multiplication increment 3$d$ is taken out of the system to reach the reduction of the biosludge amount, so that 50% of this increment is disposed as the digested sludge. In the technique taught in Japanese Patent Publication No. 11813/1974, the multiplicated sludge 3$d$ removed as excess sludge is subjected to hydrolysis to convert it into BOD components, whereupon the resulting mass is returned to the aerobic biological treatment system 1. By this technique, however, a further newly grown biosludge is formed by the additional BOD from the hydrolysis, resulting in an occurrence of excess sludge after successive treatments.

In FIG. 1, the dotted line 5 indicates the case where the treatment employs an ozone treatment system 2, instead of employing hydrolysis. By returning the multiplicated sludge 3$d$ to the aerobic biological treatment system 1, after it has been ozonated, the BOD portion formed by the ozone treatment will be converted into an additional amount of biosludge 3$e$ as a substantial multiplication increment of biosludge which has to be removed as excess sludge. Thus, the biosludge reduction rate in the case where the multiplicated sludge 3$d$ is returned to the aerobic biological treatment system 1 after it has been ozonized may amount to 30-40%, based on the weight of the multiplicated biosludge increment 3$d$, which is lower than that reached in conventional anaerobic or aerobic digestion.

If, in contrast, a greater amount of biosludge 3$f$ than that of the multiplicated biosludge 3$d$ is extracted from the aerobic biological treatment system 1 and is subjected to an ozone treatment in the ozone treatment system 2 to convert it into BOD components, before it is returned to the aerobic biological treatment system 1 as an ozonized biosludge 6, a further grown biosludge 3$g$ will be formed from the portion of BOD produced by the ozone-decomposition. Here, the difference between the extracted amount of biosludge 3$f$ and the formed amount of biosludge 3$g$ corresponds to the mineralized amount 3$h$.

When a greater amount of biosludge 3$f$ than the multiplicated amount 3$d$ is extracted and subjected to an ozone treatment to convert it into BOD components, the proportion of the mineralization will be greater than the case where only the multiplicated amount 3$d$ is subjected to ozone treatment, whereby the biosludge reduction rate is increased. By adjusting the amount of the extracted biosludge 3$f$ in such a manner that the amount of the multiplicated biosludge 3$d$ is equal to the amount of mineralization 3$h$, the amount of excess biosludge will reach substantially zero. If the amount of multiplicated biosludge 3$d$ is greater than the amount of mineralization 3$h$, the difference between them corresponds to the amount of substantial increment 3$i$ which is exhausted out of the system as excess sludge 7. 8 represents the treated water from the aerobic biological treatment system 1.

Designating the volume of the aeration tank in the aerobic biological treatment system 1 as V, the concentration of the biosludge thereof as X, the yield of the biosludge as Y, the flow rate of the aqueous waste to be treated (the flow rate of the treated liquor) as Q, the organic matter concentration in the aqueous organic waste to be treated (below, denoted as raw waste) as Ci, the organic matter concentration of the treated liquor as Ce, the concentration of the organic matter which is biologically treated as Ci–Ce, the autolysis reaction constant of the biosludge as Kd, the exhausted amount of excess sludge as q, the extracted amount supplied to the ozonization vessel as Q′ and the proportion of the ozonized biosludge which is re-converted into an additional biosludge as k, the material balance is represented by the following equation (1).

$$V \cdot dX/dt = Y \cdot Q \cdot (Ci-Ce) - V \cdot Kd \cdot X - q \cdot X - Q' \cdot X + k \cdot Q' \cdot X \qquad (1)$$

In equation (1), the left side term V·dX/dt represents the variation rate of the biosludge 3$a$ in the aerobic biological treatment system 1, the first term in the right side Y·Q·(Ci–Ce) is the amount of the formed biosludge 3$b$, the term V·Kd·X is the autolyzed amount 3$c$, the term q·X is the exhausted amount of excess sludge, the term Q′·X is the extracted amount of the biosludge 3$f$ and the term k·Q′·X is the amount of the formed biosludge 3$g$.

Assuming (Ci–Ce)/V=LV (volumetric organic load), q/V=1/STR (excess sludge residence time ratio), Q′/V=θ (recirculation ratio of biosludge recirculated to the ozone treatment system) and (1–k)=δ (mineralization ratio), equation (1) can be rewritten by the following equation (2).

$$Y \cdot LV/X = Kd + 1/STR + \delta\theta \qquad (2)$$

In an ordinary aerobic biological treatment system which is devoid of the ozone treatment system 2, the third term (δθ) of equation (2) is omitted, so that the excess sludge (X/STR) is determined by the second term, when the biosludge load is constant. In contrast, in a treatment system having an ozone treatment, the biosludge reduction is determined by the value of the third term of equation (2). Under the condition in which the value of the third term of equation (2)

is comparable to the value of the second term thereof, it is able to settle the biosludge load at an ordinary value, even when the exhaustion of excess sludge is omitted (1/SRT=0).

Figure 2:
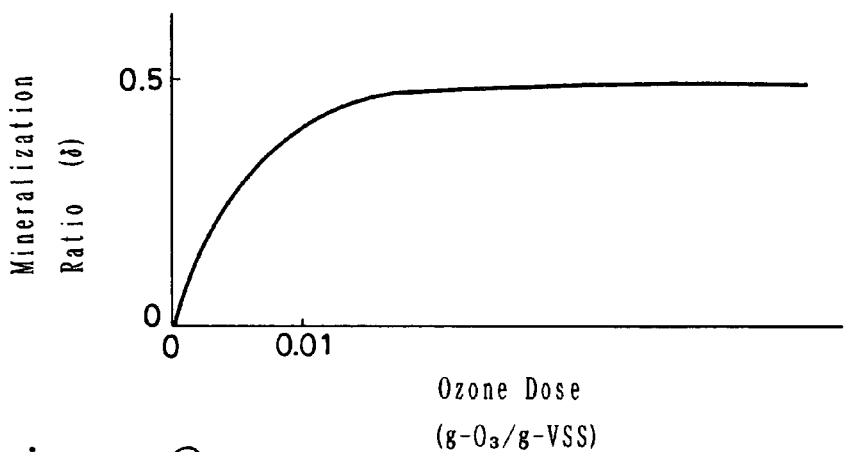
FIG. 2 is a graph showing the relationship between the rate of dosage of ozone (ozone dose) and the mineralized proportion (mineralization ratio).
Figure 3:
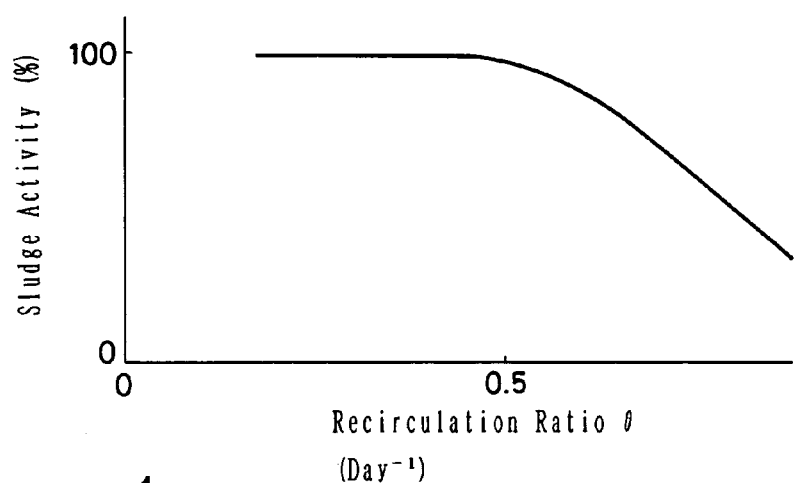
FIG. 3 is a graph showing the relationship between the recirculated proportion (recirculation ratio) and the biological activity of the biosludge (sludge activity).
Figure 4:
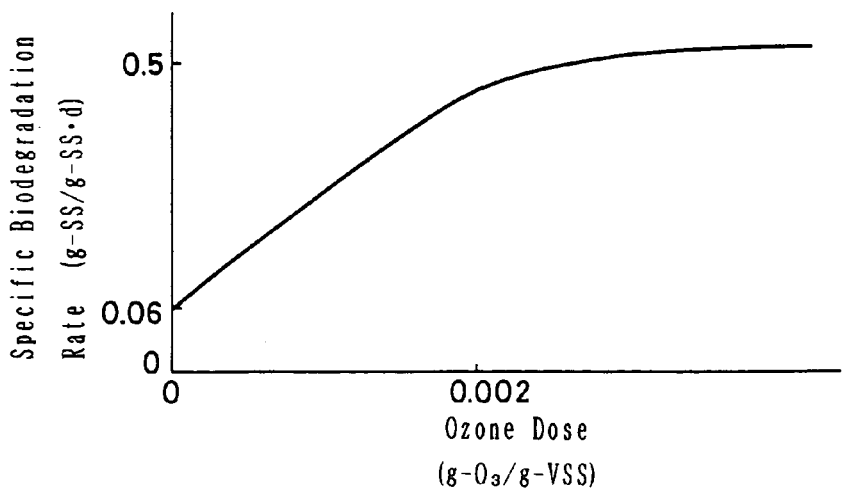
FIG. 4 is a graph showing the relationship between the ozone dose and the specific rate of biodegradation (specific biodegradation rate).

FIG. 2 is a graph showing the relationship between the ozone dose for the extracted sludge and the mineralization ratio δ. FIG. 3 is a graph showing the relationship between the recirculation ratio θ and the biosludge activity. FIG. 4 is a graph showing the relationship between the ozone dose and the specific biodegradation rate for the ozonized biosludge.

The third term of the equation (2) consists of the product of the mineralization ratio δ and the recirculation ratio θ. Since the value of δ reaches a constant value of about 0.5 to an ozone dose of 0.01 g-$O_3$/g-VSS or higher, as shown in FIG. 2, the apparent biosludge reduction rate in this region is determined in proportion to θ.

On the other hand, the recirculation ratio θ does not have any influence on the activity of the biosludge up to a value of about 0.5 $day^{-1}$, as shown in FIG. 3. This means that the activity of a biosludge in the aerobic biological treatment system 1 is maintained even if ½ or less of the biosludge 3a retained in the aerobic biological treatment system 1 is extracted as the extracted sludge 3f and recycled to the ozone treatment system 2.

Therefore, the upper limit of the recirculation ratio θ is fixed at 0.5 $day^{-1}$. At θ=0, the biotreatment system 1 operates at a condition of complete oxidation. Here, the sludge load is low and the biosludge reduction effect is also low. If the amount of the extracted sludge 3f equals that of the multiplicated sludge 3d, the biosludge reduction rate will be similar to that of the conventional techniques. In ordinary aerobic biological treatment, the SRT is settled at 10 days and the rate of sludge extraction at 0.1 days. When, in the process according to the present invention, a greater amount of the extracted biosludge 3f than the multiplicated biosludge 3d is recirculated, the lower limit of the recirculation ratio θ is fixed to exceed 0.1 $day^{-1}$. It is preferable that this lower limit is fixed at 0.2 $day^{-1}$ or higher, wherein, in particular, at a θ of 0.3 $day^{-1}$, 100% biosludge reduction with no excess sludge formation may be attainable.

As seen in FIG. 4, the biodegradability of the ozonized biosludge tends to decrease at lower ozone doses and it is quite low below an ozone dose of 0.002 g-$O_3$/g-VSS. Therefore, the lower limit of the ozone dose is fixed to be 0.002 g-$O_3$/g-VSS. While there is no special upper limit for the ozone dose, it is preferable from the economical point of view to settle at an upper limit of 0.05 g-$O_3$/g-VSS.

From the above, the maximum value of the third term δθ of equation (2) is 0.5×0.5=0.25 $day^{-1}$. Therefore, under usual operation conditions in which the SRT in an ordinary aerobic biological treatment system is 4 days, namely, the operation condition in which ¼ of the total sludge in the system is exhausted as excess sludge per day, an operation without any exhaustion of the excess sludge 7 (1/SRT=0) will be possible by recirculating the exhausted biosludge to the ozone treatment system 2.

Since the activity of the biosludge in the aerobic biological treatment system 1 decreases at lower ozone doses, the ozone treatment should be applied to the biosludge extracted from the aerobic biological treatment system 1. This extraction of the biosludge from the aerobic biological treatment system may be realized either at the aeration tank, the solid/liquid separation unit or membrane separation unit. If the biosludge is extracted from the aeration tank, a relatively constant amount of biosludge can be extracted, though it has a lower concentration. When the biosludge is extracted from the solid/liquid separation unit as the separated sludge or from the membrane separation unit as a sludge concentrate, the extracted amount of the sludge tends to fluctuate, though it has a high concentration.

PREFERRED EMBODIMENT OF THE DISCLOSURE

Below, the present invention is further described by way of examples.

Figure 5:
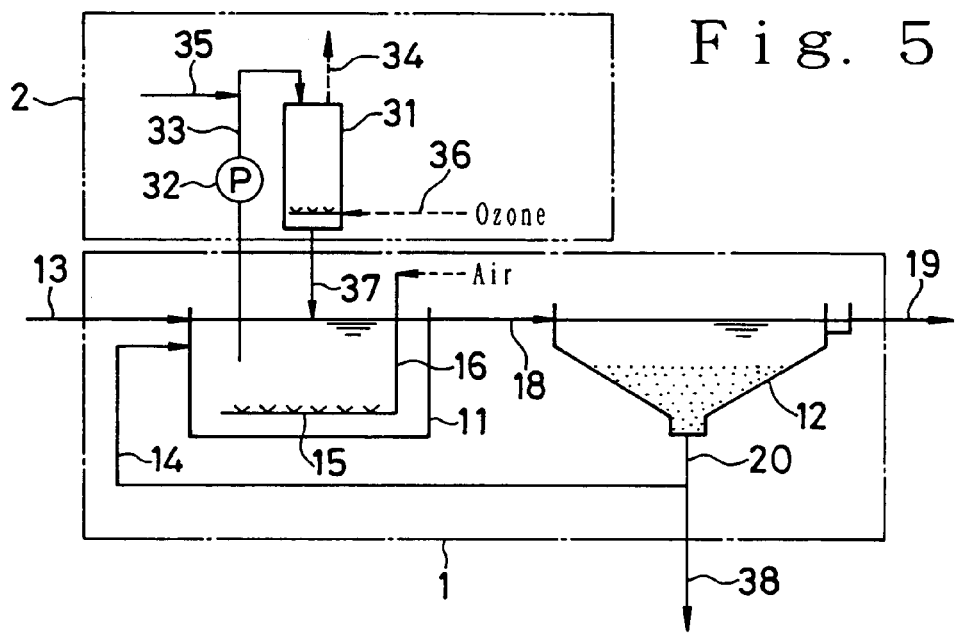
FIG. 5 shows a flow sheet for an embodiment of an apparatus for the biological treatment of wastes according to the present invention including an ozone treatment of the aqueous suspension in the aeration tank.
Figure 6:
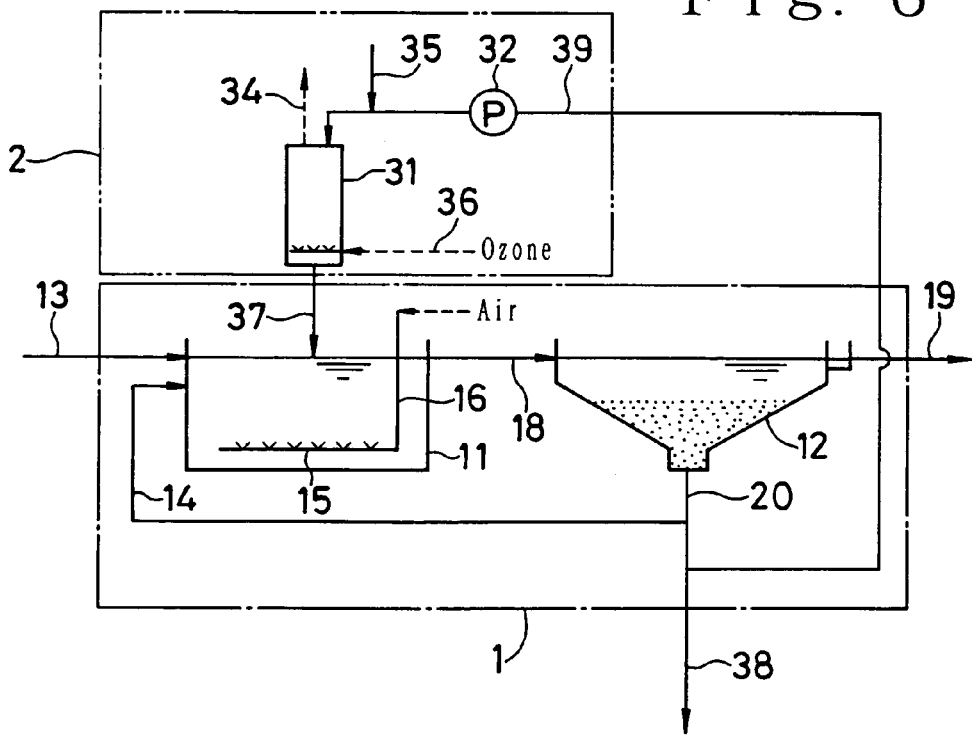
FIG. 6 shows a flow sheet for another embodiment of an apparatus for biological treatment of wastes according to the present invention including an ozone treatment of the sludge separated in a solid/liquid separation unit.

FIGS. 5 and 6 each show a flow sheet of the biological treatment apparatus in two different embodiments in which FIG. 5 shows the embodiment wherein the sludge suspension in the aeration tank is subjected to an ozone treatment and FIG. 6 shows the embodiment in which the sludge separated from the solid/liquid separation unit is subjected to an ozone treatment.

As shown in FIG. 5, the aerobic biological treatment system 1 is composed of an aeration tank 11 and a solid/liquid separation unit 12. The aeration tank 11 is connected with a raw waste supply line 13 and a sludge return line 14 and is provided at its bottom portion with an air distributor 15 which is connected to an air supply line 16. The aeration tank 11 is connected with the solid/liquid separation unit 12 via a connection line 18. The solid/liquid separation unit 12 is connected with a treated water discharge line 19 and a separated sludge exhaustion line 20 from which the sludge return line 14 branches. The ozone treatment system 2 is constituted of an ozone treatment unit having an ozonization vessel 31 which is connected with an extraction line 33 having a pump 32 and a gas discharge line 34. The extraction line 33 is connected with an inorganic acid supply line 35. The ozonization vessel 31 is connected at its lower part with an ozone supply line 36 and an ozonized liquor delivery line 37 which is connected to the aeration tank 11. 38 represents the excess sludge exhaustion line.

In the biosludge treating apparatus shown in FIG. 5, an aerobic biological treatment is carried out by supplying the aeration tank 11 with a raw waste from the raw waste supply line 13, contacting the supplied raw waste in the aeration tank 11 with an activated sludge growing in the aeration tank 11 and with the recycled biosludge returned via the sludge return line 14, while aerating the sludge suspension in the tank by the air supplied via the air supply line 16 and blown thereinto through the air distributor 15. By this aerobic biological treatment, the organic matters in the raw waste are subjected to a biodegradation by a biological oxidation. A part of the sludge suspension (mixed liquor) in the aeration tank 11 is guided into the solid/liquid separation unit 12 through the connection line 18, in which it is separated by sedimentation into the separated liquid and the separated sludge. The separated liquid is exhausted out of the system as the treated water via the treated water discharge line 19 and a part of the separated sludge is returned to the aeration tank 11 as the recycled sludge via the sludge return line 14 and the remainder is exhausted out of the system as the excess sludge via an excess sludge exhaustion line 38.

A part of the sludge suspension in the aeration tank 11 is extracted via the extraction line 33 by the pump 32 and is guided into the ozonization vessel 31 after it has been subjected to a pH control by adding thereto an amount of an inorganic acid via the inorganic acid supply line 35 to adjust it to a pH of 5 or lower. In the ozonization vessel 31, the sludge extracted from the aeration tank 11 is brought into contact with ozone supplied via the ozone supply line 36 to effect the ozonization thereof and convert it into BOD components. Here, an ozone dose of 0.005-0.02 g-$O_3$/g-VSS may suffice. The spent ozone-containing gas is discharged out of the system via the gas discharge line 34.

The ozonized sludge suspension is returned to the aeration tank 11 through the ozonized liquor delivery line 37 and is subjected to the aerobic biological treatment as a load to be treated. By subjecting the ozonized sludge suspension to an aerobic biological treatment by recycling it to the aeration tank 11, the thereby formed BOD components are metabolized in the cells of the microorganisms and are removed by biodegradation, whereby the amount of excess sludge formed in the aerobic biological treatment system 1 is reduced.

In the embodiment shown in FIG. 6, a part of the separated sludge from the solid/liquid separation unit 12 is fed to the ozonization vessel 31 via the separated sludge extraction line 39. In the embodiment shown in FIG. 6, the biological treatment of the raw waste is essentially in the same manner as in the embodiment of FIG. 5, except that a part of the separated sludge from the solid/liquid separation unit 12 is supplied to the ozonization vessel 31 to be subjected to an ozone treatment. In the embodiment of FIG. 6 also, the requisite amount of ozone can be reduced as in the embodiment of FIG. 5 and the amount of excess sludge formed can also be reduced.

Both in the embodiments of FIGS. 5 and 6, the calculation of equation (1) is accomplished based on the volume V of the aeration tank 11, the calculated concentration X of the total sludge retained in the aeration tank 11 and in the solid/liquid separation unit 12 divided by the volume V and the amount Q' calculated from the sludge concentration X. From this, each value can be determined for both the embodiments of FIGS. 5 and 6 by assuming the operation to be carried out in the aerobic biological treatment system 1 as shown in FIG. 1.

In the embodiments of FIGS. 5 and 6, a biosludge reduction can be attained by ozone-treating the greater amount of the extracted sludge than the multiplicated sludge. However, if the excess sludge is not zero, this possible excess sludge is exhausted out of the system via the excess sludge exhaustion line 38. By adjusting the extracted amount of biosludge so as to equalize the amount of multiplicated biosludge and the mineralized amount of biosludge, the amount of excess sludge formed can be decreased to zero, resulting in no exhaustion of excess sludge from the exhaustion line 38. If, in such a case, however, inorganic substances, such as sand etc., accumulate, exhaustion of the corresponding amount of sludge may be incorporated.

Figure 7:
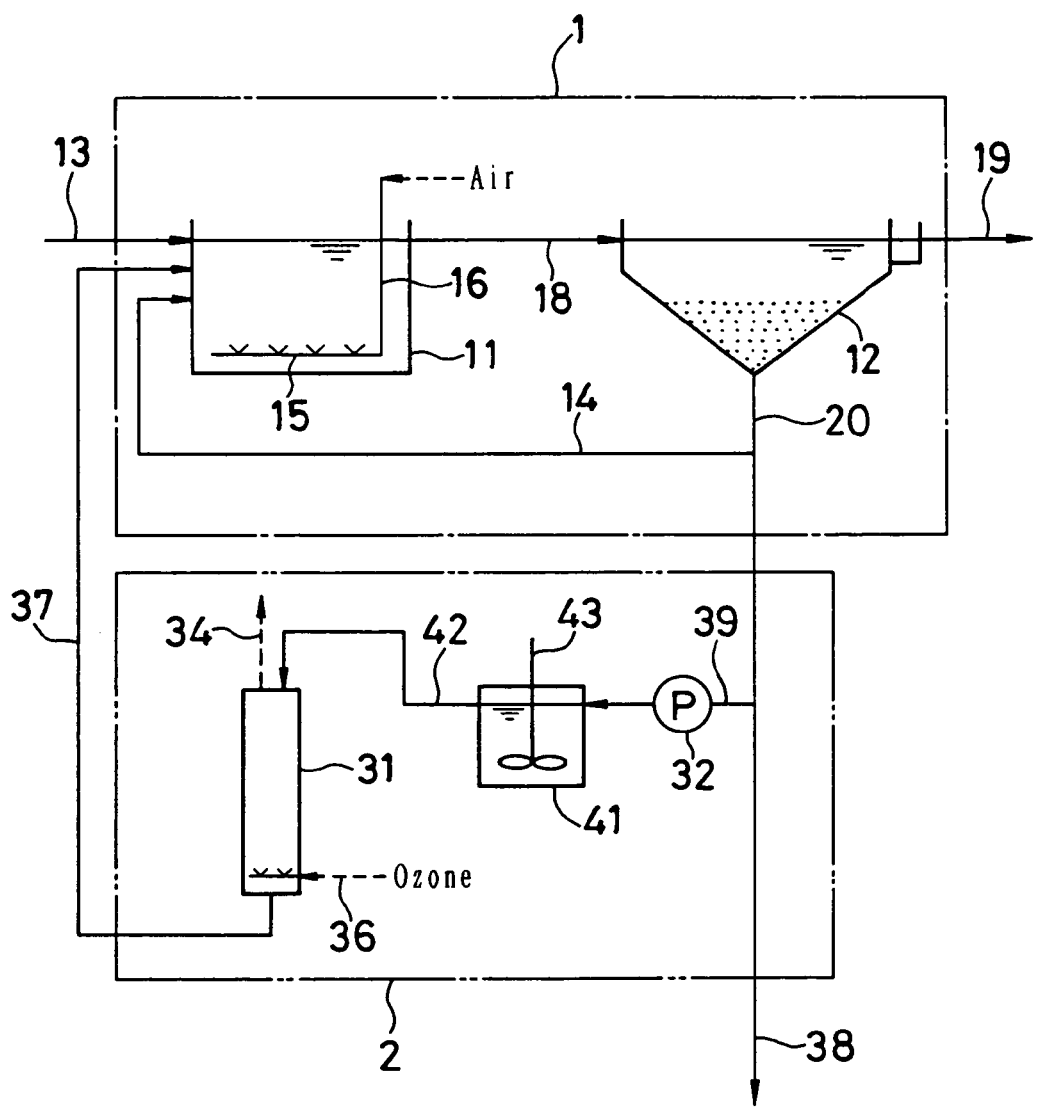
FIG. 7 shows a flow sheet for still another embodiment of an apparatus for biological treatment of wastes according to the present invention including acidogenesis of the biosludge.

FIG. 7 shows a flow diagram of an embodiment of the aerobic biological treatment apparatus employing an ozone treatment of the biosludge after the pH thereof has been adjusted to 5 or lower in a step of acidogenesis by an anaerobic biological treatment. In the apparatus of FIG. 7, 41 denotes a vessel for an anaerobic biological treatment, to which a part of the separated sludge from the solid/liquid separation unit 12 is supplied via the separated sludge extraction line 39 and in which an anaerobic biological treatment is carried out. The so-treated sludge suspension is supplied to the ozonization vessel 31 via a connection line 42. Other constructions of the apparatus are the same as those of FIG. 6.

In the embodiment of FIG. 7, the acidogenesis is realized by mixing a part of the separated sludge from the solid/liquid separation unit 12 and a biosludge containing acid-forming bacteria in the anaerobic biological treatment vessel 41, while agitating the mixture by an agitator 43 under an anaerobic condition, so as to reach a pH of 5 or lower. Here, a part of the extracted sludge is converted into BOD components by the action of the anaerobic bacteria and, at the same time, organic matters contained therein are converted into organic acids, such as acetic acid etc., by the action of the acid-forming bacteria, whereby the pH of the treated mixture decreases.

The resulting treated liquor exhausted from the anaerobic biological treatment vessel 41 is conducted to the ozonization vessel 31 via the connection line 42 and is subjected to an ozone treatment by contacting it with ozone supplied from the ozone supply line 36. The spent ozone-containing gas is discharged out of the ozonization vessel via the gas discharge line 34. By this, the biosludge in the treated liquor of the anaerobic biological treatment is converted into BOD components by an oxidative decomposition.

The ozonized suspension is recycled to the aeration tank 11 via the ozonized liquor delivery line 37 and is subjected to the anaerobic biological treatment in a similar manner as above.

As an alternative of the embodiment of FIG. 7, it is also possible to extract a part of the sludge suspension in the aeration tank 11 for subjecting it to the anaerobic biological treatment in a similar manner.

Figure 8:
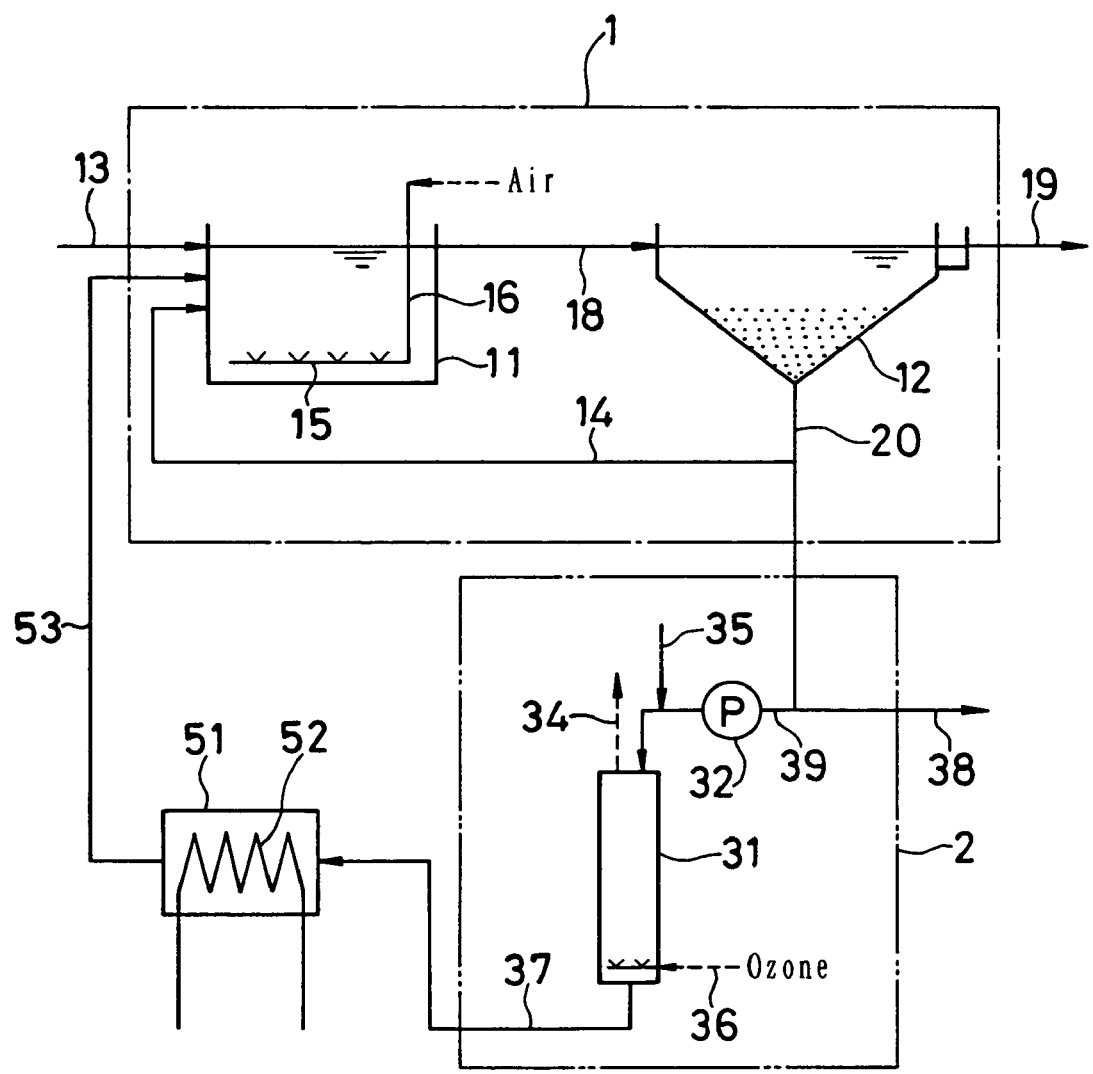
FIG. 8 shows a flow sheet for a further embodiment of an apparatus for biological treatment of wastes according to the present invention including heat treatment of the biosludge.

FIG. 8 is a flow diagram representing a biological treatment apparatus of an embodiment incorporating a heat treatment of the ozonized liquor. In the apparatus of FIG. 8, 51 denotes a heat treating vessel to which the ozonized liquor is supplied via the ozonized liquor delivery line 37 from the ozonization vessel 31 and in which it is heated by a heater 52 to effect the heating treatment. The heat-treated liquor is returned to the aeration tank 11 via a heat-treated liquor delivery line 53. Other constructions of the apparatus are the same as in the apparatus of FIG. 6.

In the embodiment of FIG. 8, the ozonized liquor is supplied to the heat treatment vessel 51 via the heat treated liquor delivery line 37 in the same manner as above and is heated by the heater 52 so as to maintain a temperature of 50-100° C. to realize the heat treatment. By this, the biodegradability of the ozonized liquor is furthermore increased.

The heat-treated liquor is returned to the aeration tank 11 via the heat-treated liquor delivery line 53 and is here subjected to the aerobic biological treatment in the same manner as above. The heat treatment can also be effected either before and/or after the ozone treatment.

In the embodiments of FIGS. 5-8, by maintaining the VSS/SS ratio and the MLVSS value of the biosludge in the aeration tank 11, the biosludge reduction is attained along with the simultaneous improvement of the sedimentation property and the dewatering performance of the resulting sludge. Thus, the amount of the extracted sludge suspension and the amount of the excess sludge exhausted out of the system are controlled so as to adjust the VSS/SS ratio and the MLVSS value of the biosludge in the aeration tank 11 at the values given previously. For this control, the biosludge reduction rate can be employed as the controlling parameter. In the case of treating the raw waste given in Table 1, the ozone treatment of the extracted sludge may be carried out so as to reach an organic sludge reduction rate of 50-80%.

By maintaining the VSS/SS ratio of the biosludge at a predetermined value, a better sedimentation property in the solid/liquid separation unit 12 is attained together with a better dewatering performance thereof. Also the biological treatment performance does not decrease, since the MLVSS value in the aeration tank 11 is maintained at a predetermined value.

Figure 9:
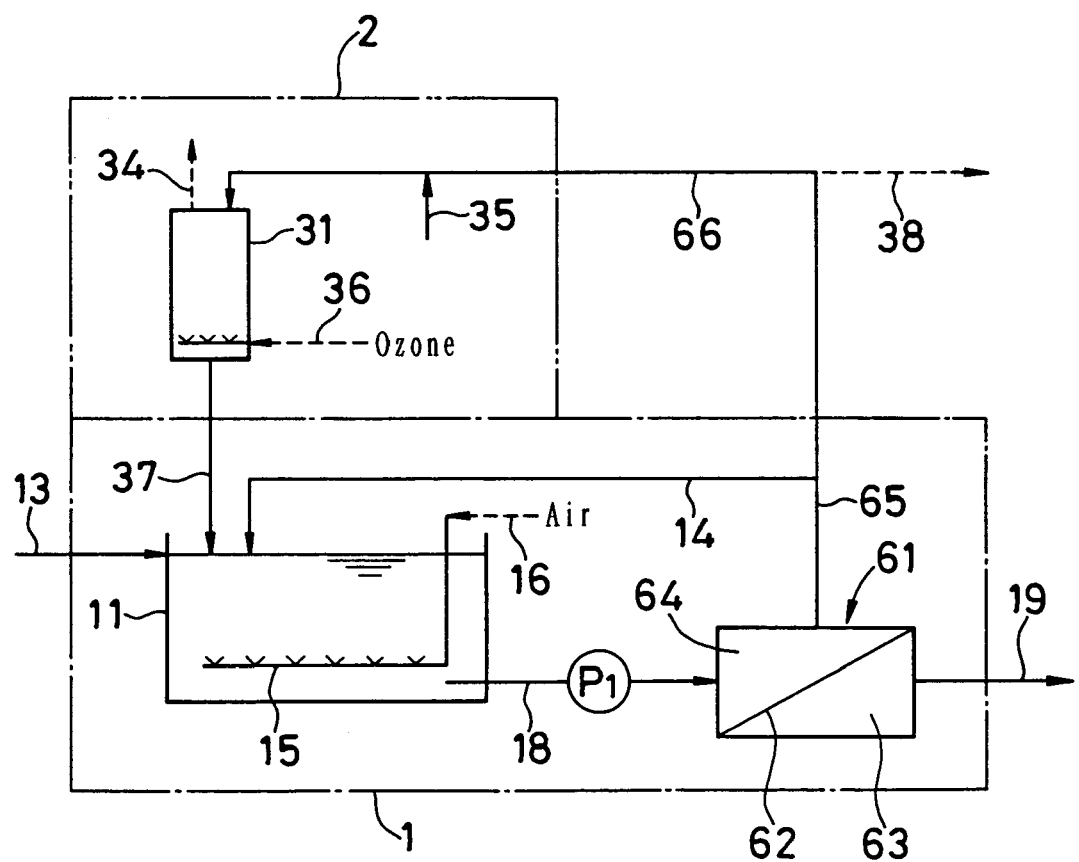
FIG. 9 shows a flow sheet for a still further embodiment of an apparatus for biological treatment of wastes according to the present invention having a membrane separation unit.
Figure 10:
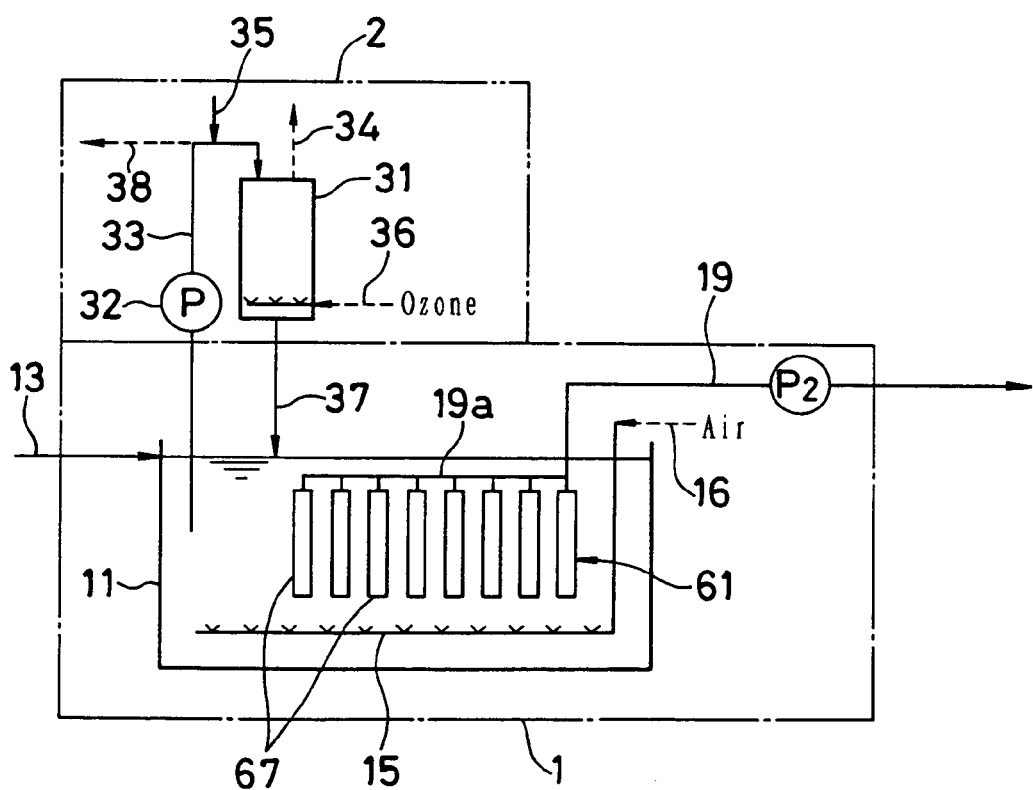
FIG. 10 shows a flow sheet for a still further embodiment of an apparatus for biological treatment of wastes according to the present invention having a membrane separation unit of another construction.

In FIGS. 9 and 10, flow diagrams for two different embodiments of the apparatus of the aerobic biological treatment of a raw waste incorporating a membrane separation unit are given. In the embodiment of FIG. 9, the membrane separation unit is arranged outside the aeration tank. In the embodiment of FIG. 10, the membrane separation unit is arranged within the aeration tank.

In the embodiment of FIG. 9, the aerobic biological treatment system 1 comprises an aeration tank 11 and a membrane separator 61. The aeration tank 11 is connected with a raw waste supply line 13 and a sludge return line 14 and is provided at its bottom with an air distributor 15 connected with an air supply line 16. The aeration tank 11 is connected with the membrane separator 61 via a connection line 18 having a pump $P_1$. The membrane separator 61 is partitioned by a separator membrane 62 into a permeated water chamber 63 connected with a treated liquor delivery line 19 and a sludge concentrate chamber 64 connected with a sludge concentrate delivery line 65 from which the return line 14 branches. For the membrane separator 61, those having a voluntary separator membrane module, such as those of tubular, spiral and hollow fiber types, may be employed.

The ozone treatment system 2 comprises an ozonization vessel 31, which is connected at its upper portion with a sludge extraction line 66 branched from the sludge concentrate delivery line 65 and with a spent gas discharge line 34 and at its lower portion with an ozone supply line 36 and an ozonized liquor delivery line 37. The extraction line 66 is connected with an inorganic acid supply line 35. The ozonization vessel 31 is connected to the aeration tank 11 via the ozonized liquor delivery line 37. 38 represents an excess sludge exhaustion line.

In the aerobic biological treatment system 1 of the embodiment of FIG. 9, an aerobic biological treatment is effected by supplying the raw waste to the aeration tank 11 via the raw waste supply line 13 and is mixed therein with the activated sludge growing in the aeration tank 11 and with the recycled sludge returned via the sludge return line 14, while blowing thereinto air supplied from the air supply line 16 through the air distributor 15. The organic matters in the raw waste are thereby decomposed by the biological oxidation reaction. A part of the sludge suspension (mixed liquor) in the aeration tank 11 is taken out of it via the connection line 18 and is fed to the membrane separator 61 under pressurization by the pump $P_1$ to effect membrane separation into a permeated liquor and a sludge concentrate. The permeated liquor passing through the separator membrane 62 is discharged at the treated water discharge line 19, while the sludge concentrate including the activated sludge and other solid matters is removed from the separator via the concentrate delivery line 65 and a part thereof is returned to the aeration vessel 11 via the return line 14.

In the ozone treatment system 2, a part of the sludge concentrate taken out of the separator via the concentrate delivery line 65 and the exhaustion line 66 is supplied to the ozonization vessel 31 after it has been subjected to a pH control by adding an inorganic acid thereto from the inorganic acid supply line 35 to adjust the pH thereof at 5 or below, in order to subject it to an ozone treatment by contacting it with ozone supplied thereto from the ozone supply line 36, whereby the activated sludge is converted into BOD components. The ozonized sludge suspension is recycled to the aeration tank 11 via the ozonized liquor delivery line 37 and is here subjected to an aerobic biological treatment as a load to be treated. By effecting the aerobic biological treatment of the raw waste and recirculation of the ozonized sludge suspension to the aeration tank 11, the properties of the activated sludge in the aeration tank 11 are improved, whereby any blocking of the separator membrane 62 in the membrane separator 61 is avoided and membrane separation is realized at a high permeation flux with the simultaneous attainment of an excess sludge amount reduction.

In the embodiment of FIG. 10, the membrane separator 61 is disposed inside the aeration tank 11 and the sludge suspension in the aeration tank is supplied to the ozonization vessel 31. For the membrane separator 61, there may be employed those which are disclosed in Japanese Patent Application Kokai Nos. 129094/1986 and 293103/1989, namely those in which a plurality of modules 67, each provided with flat separation membranes, are arranged above the air distributor 15 so as to face the membrane surface in the perpendicular direction and each of the modules 67 is connected to the treated water discharge line 19 provided with a sucking pump $P_2$ through each branch line 19a.

The ozonization vessel 31 is connected to the aeration tank 11 via the extraction line 33 having a pump 32 and connected to the inorganic acid supply line 35.

The aerobic biological treatment in the aeration tank 11 of the raw waste in the embodiment of FIG. 10 is carried out in the same manner as in the embodiment of FIG. 9. The membrane separation is effected by actuating the pump $P_2$ to place a vacuum on the inside of the separator cell to produce a pressure drop between the outer and inner surfaces of the membrane in each module 67 as the permeation driving force. The liquid phase of the sludge suspension in the aeration tank permeates through the separation membrane and is exhausted out of the separator via the treated water discharge line 19, while the activated sludge and other solid matters are retained within the suspension in a concentrated form, whereby a phenomenon similar to the recycling of the sludge occurs. The activated sludge and other solid matters attached to the membrane surface are removed by the action of the air bubbles rising from the air distributor 15, whereby a clean membrane surface of each module 67 is maintained.

A part of the sludge suspension is extracted from the aeration tank 11 by the pump 32 through the extraction line 33 and is supplied to the ozonization vessel 31, after it has been subjected to a pH control by an addition of an inorganic acid from the inorganic acid supply line 35 to adjust the pH at 5 or lower, and the activated sludge in the suspension is decomposed here. The ozonized liquor is recycled to the aeration tank 11 via the ozonized liquor delivery line 37 and is here subjected to an aerobic biological treatment as a load to be treated. In this manner, the permeation flux of the membrane separator 61 is held at a high level, as in the case of the embodiment of FIG. 9, whereby the reduction of the excess sludge amount is achieved.

Both in the embodiments of FIGS. 9 and 10, the calculation of equation (1) is accomplished based on the volume V of the aeration tank 11, the calculated concentration X of the total sludge retained in the aeration tank 11 and in the membrane separator 61 divided by the volume V and the amount Q' calculated from the sludge concentration X in the aeration tank 11 or membrane separator 61. From this, each value can be determined for both the embodiments of FIGS. 9 and 10 by assuming the operation to be carried out in the aerobic biological treatment system 1 as shown in FIG. 1.

In the embodiments of FIGS. 9 and 10, a biosludge reduction can be attained by ozone treatment of the greater amount of the extracted sludge than the multiplicated sludge. However, if the excess sludge is not zero, this possible excess sludge is exhausted out of the system via the excess sludge exhaustion line 38. By adjusting the extracted amount of biosludge so as to equalize the amount of multiplicated biosludge and the mineralized amount of biosludge, the amount of excess sludge formed can be decreased to zero, resulting in no exhaustion of excess sludge from the exhaustion line 38. If, in such a case, however, inorganic substances, such as sand, etc., accumulate, exhaustion of the corresponding amount of sludge may be incorporated.

Figure 11:
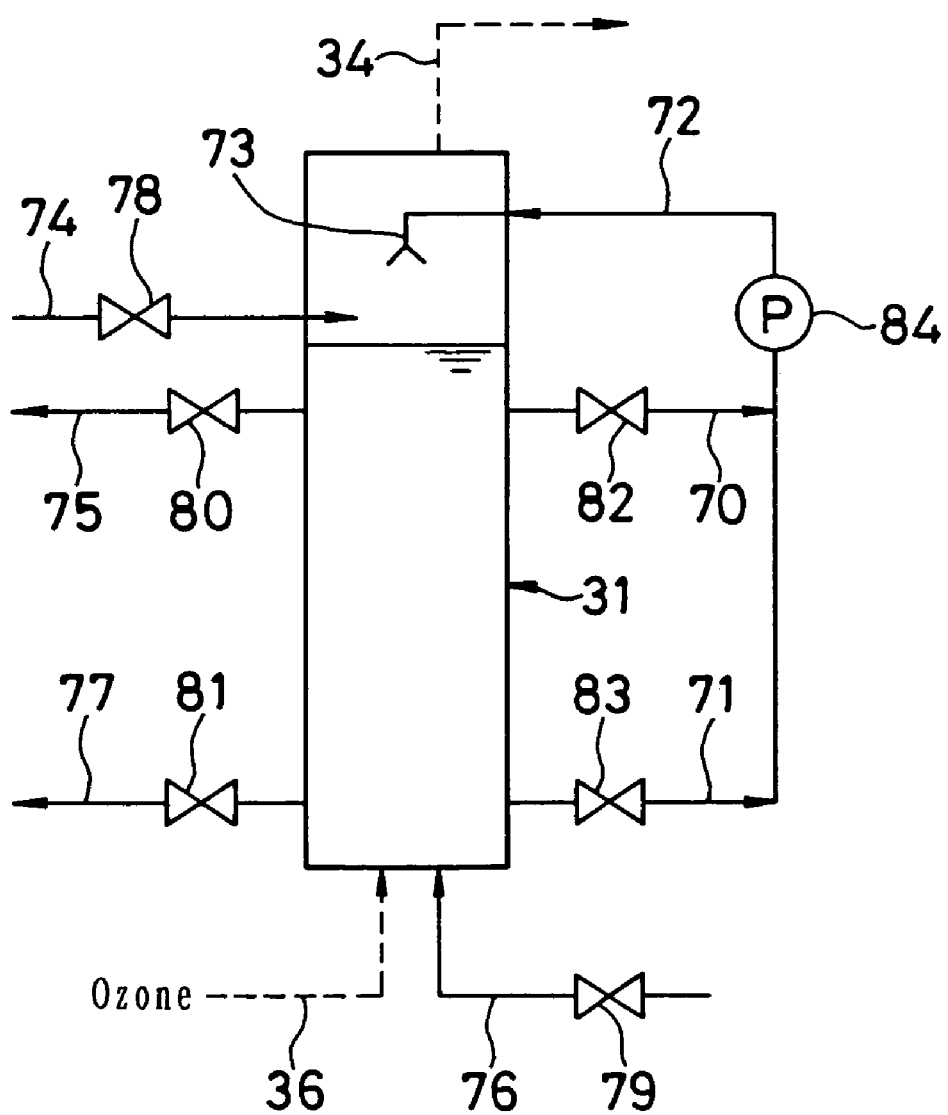
FIG. 11 shows an embodiment of the ozone treatment unit in a flow diagram.

By employing the ozone treatment unit shown in FIG. 11 for the ozone treatment unit in the embodiments of FIGS. 5 to 10, an efficient ozone treatment can be attained by a compact and small-sized apparatus with the exclusion of problems due to foaming.

In FIG. 11, 31 represents an ozonization vessel which is constructed in such a manner that a part of the sludge suspension in the ozonization vessel is extracted via the extraction lines 70 and 71 by a pump 84 and is sprayed onto the liquid surface through the circulation line 72 and the spray nozzle 73. The ozone treatment unit 31 is provided at its top with a spent gas discharge line 34 and at its upper portion with a sludge suspension supply line 74, a treated liquor discharge line 75, a sludge suspension extraction line 70 and a circulation line 72. The circulation line 72 is connected with a spray nozzle which is disposed above the liquid surface in the vessel so as to enable to spray the sludge suspension extracted from the vessel through the extraction lines 70 and 71 onto the liquid surface. The ozonization vessel 31 is connected at its bottom with an ozone supply line 36 and a sludge suspension supply line 76 and at its lower portion with the extraction line 71 and an ozonized liquor delivery line 77. In each of the sludge suspension supply lines 74 and 76, the ozonized liquor discharge lines 75 and 77 and the extraction lines 70 and 71, corresponding valves 78, 79, 80, 81, 82 and 83 are disposed. 84 is a pump. The sludge suspension supply lines 74 and 76 communicate to the extraction line 33 or to the separated sludge extraction line 39 in the embodiments of FIGS. 5-10. The ozonized liquor delivery lines 75 and 77 communicate to the ozonized liquor delivery line 37 in the embodiments of FIGS. 5-10.

When the sludge suspension is extracted through the extraction line 70 connected to the upper portion of the ozonization vessel 31, the sludge suspension near the liquid surface of the ozonization vessel is taken out. When the sludge suspension is extracted through the extraction line 71 connected to a lower portion of the ozonization vessel 31, the sludge suspension existing near the bottom of the ozonization vessel is taken out.

For treating the sludge suspension containing sludge particles apt to float up using the unit shown in FIG. 11, it is preferable to effect the treatment based on the counter-flow principle. Here, the valves 79, 80 and 83 are held closed and the valves 78, 81 and 82 are held open. In this state, the sludge suspension to be ozonized which has been adjusted at a pH of 5 or lower is supplied to the ozonization vessel 31 through the sludge suspension supply line 74 connected to the upper portion of the ozonization vessel 31 and, at the same time, ozone or an ozone-containing gas is supplied thereto via the ozone supply line 36, so as to cause an ozone treatment in counter-flow to subject the biosludge to an oxidative decomposition into BOD components.

Then, the sludge suspension in the ozonization vessel is extracted by actuating the pump 84 from the sludge suspension extraction line 70 connected to the upper portion of the ozonization vessel 31 and is sprayed into the liquid surface through the recirculation line 72 and the spray nozzle 73.

The extraction and spraying may be carried out either continuously or intermittently. The spent ozone-containing gas is discharged out of the vessel via the gas discharge line 34 and the ozonized liquor is exhausted from the vessel through the ozonized liquor delivery line 77 connected to the lower portion of the ozonization vessel 31. Such an ozone treatment by the counter-flow contact may be applied also to the case where the proportion of sludge particles floating up is greater than the proportion of those settling down, in addition to the case where the sludge particles tend to float up in the ozonization vessel 31.

For treating the sludge suspension containing sludge particles apt to settle in the suspension using the unit shown in FIG. 11, it is preferable to effect the treatment by parallel-flow contact. Here, the valves 78, 81 and 82 are held closed and the valves 79, 80 and 83 are held open. In this state, the sludge suspension to be ozonized is supplied to the ozonization vessel 31 through the sludge suspension supply line 76 connected to the lower portion of the ozonization vessel 31 and, at the same time, ozone or an ozone-containing gas is supplied thereto via the ozone supply line 36, so as to cause an ozone treatment in parallel-flow. The sludge suspension in the ozonization vessel is extracted from the sludge suspension extraction line 71 connected to the lower portion of the ozonization vessel 31. The ozonized liquor is exhausted from the vessel through the ozonized liquor delivery line 75 connected to the upper portion of the ozonization vessel 31. Other procedures are the same as in the counter-flow treatment. Such an ozone treatment by the parallel-flow contact may be applied also to the case where the proportion of sludge particles settling down is greater than the proportion of those floating up, in addition to the case where the sludge particles tend to settle down in the ozonization vessel 31.

In both cases, the occurrence of foaming is suppressed by the spraying of the sludge suspension extracted from the ozonization vessel onto the liquid surface, whereby any foaming trouble can be prevented. Here, the ozone treatment efficiency is further increased by the circulation of the sludge suspension in the vessel with agitation, resulting in a higher efficiency of contact between the sludge particles and ozone. Due to elimination of the dilution of the sludge suspension in the ozonization vessel, as contrasted to the case where industrial water is sprayed as the foam suppressing liquor, this technique contributes to a further increase in the ozonization efficiency. Due to exclusion of the use of any antifoaming agent, an interlacing of bubbles will not occur, so that the gas/liquid mass transfer efficiency is increased, whereby the requisite amount of ozone can be reduced.

By the ozone treatment and agitation by pump circulation, the sludge particles will be atomized in general to a size of about 0.1 mm, resulting in a decrease in the adhering tendency of the sludge. Thus, no blocking of the spray nozzle 73 may occur, when such a sludge suspension in the ozonization vessel is sprayed. On the other hand, when spraying a sludge suspension without being subjected to ozone treatment, blocking of the spray nozzle by the solid substances contained therein may often occur, so that the sludge suspension which has not been ozonized sufficiently should not be employed as the foam suppressing liquid.

While the ozone treatment unit shown in FIG. 11 can be applied either to the counter-flow- or parallel-flow-gas/liquid contact, it is possible to modify the unit so as to adapt to either one of the operation principles by eliminating the unnecessary members and construction parts.

Figure 12:
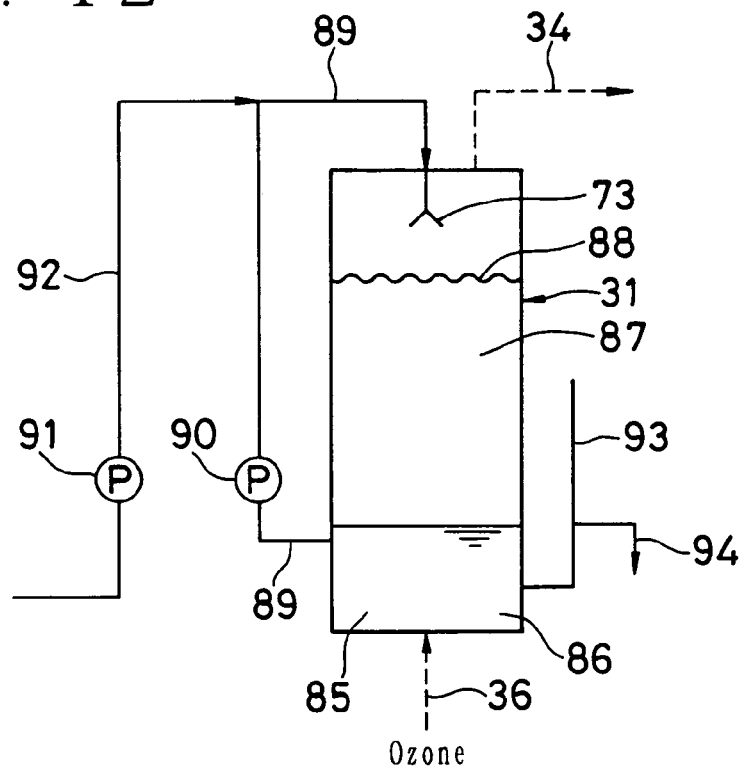
FIGS. 12 to 14 each show a different embodiment of the ozone treatment unit in a flow diagram.
Figure 13:
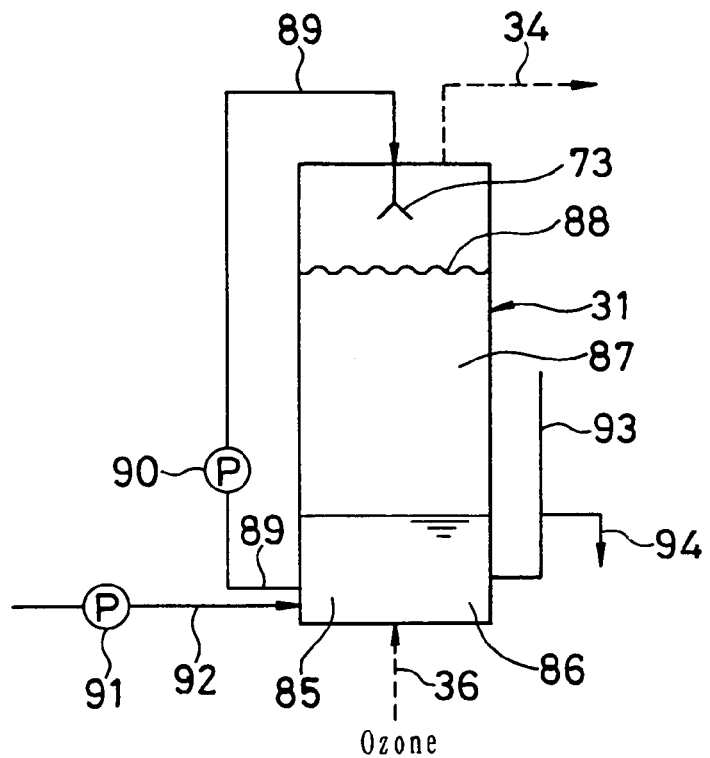
Figure 14:
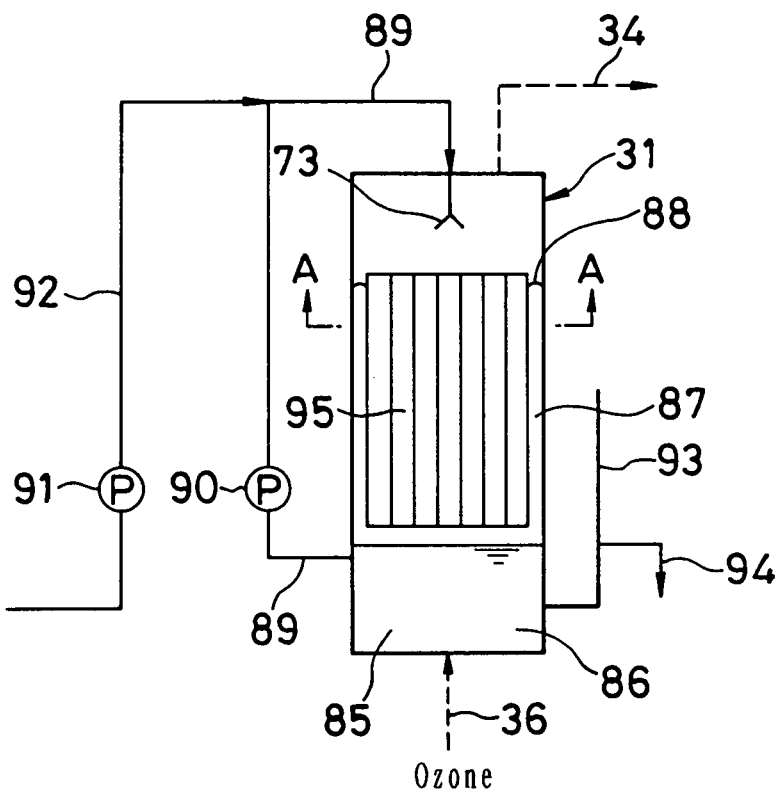
Figure 15:
FIGS. 15(a) and 15(b) each show the A-A cross section of either alternative structure of the unit of FIG. 14.
Figure 15:
Figure 15:
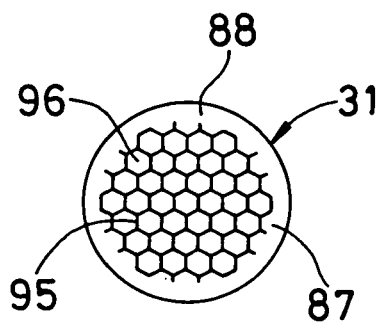
Figure 15:
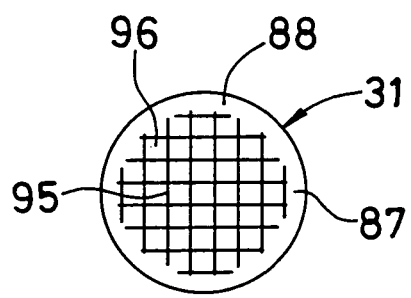

By employing either one of the ozone treatment units shown in FIGS. 12-14 in the embodiments of FIGS. 5-10, the ozone treatment efficiency may further be increased. FIGS. 15(*a*) and 15(*b*) each represent the section of the ozone treatment unit of FIG. 14 along the line A-A in either alternative construction. In FIG. 12, 31 denotes the ozonization vessel in which a liquid contacting zone 86 is formed from filling up with the sludge suspension 85. Above the liquid level of the liquid contacting zone 86 is formed a foaming contacting zone 87 in which a foam layer 88 is built up by foaming up the sludge suspension by the ozone-containing gas blown thereinto.

The ozonization vessel 31 is provided with a recirculation line 89 which serves to extract a part of the sludge suspension 85 from a lower portion of the liquid contacting zone 86 and to recirculate it to an upper portion of the foam contacting zone 87. The recirculation line 89 is provided with a recirculation pump 90 and at its top with a spry nozzle 73. The recirculation line 89 is connected to a sludge suspension supply line 92 having a supply pump 91. The ozonization vessel 31 is connected at its liquid contacting zone 86 with an ozonized liquor delivery line 94 having a syphon breaker 93. The ozonization vessel 31 is connected at its bottom with an ozone supply line 36 for blowing an ozone-containing gas to the liquid contacting zone 86 and at its top with a gas discharge line 34 for discharging the spent ozone-containing gas. The sludge suspension supply line 92 is connected to the extraction line 33 or to the separated sludge extraction line 39 of each of the embodiments of FIGS. 5-10. The ozonized liquor delivery line 94 is connected to the ozonized liquor delivery line 37 of each of the embodiments of FIGS. 5-10.

In the embodiment of FIG. 13, the sludge suspension supply line 92 is connected to a lower portion of the ozonization vessel 31 and the recirculation line 89 is guided off the vessel at a position near the bottom and remote from the liquid surface of the liquid contacting zone 86. Other constructions are essentially the same as the embodiment of FIG. 12.

In the embodiment of FIG. 14, a foam layer support element 95 is disposed in the foam contacting zone 87. The foam layer support element 95 may consist of a honeycomb lattice as shown in FIG. 15(*a*) or a lattice screen as shown in FIG. 15(*b*) and is disposed in the ozonization vessel so as to face the surface of the mesh 96 towards the vertical direction. Other constructions are essentially the same as those of the embodiment of FIG. 12.

For realizing the ozone treatment of the sludge suspension in the ozone treatment unit shown in FIG. 12, the sludge suspension which has been adjusted at a pH of 5 or lower is supplied to the ozonizing vessel using the supply pump 91 through the sludge suspension supply line 92, while recirculating a part of the sludge suspension 85 in the ozonization vessel using the recirculation pump 90 via the recirculation line 89. The sludge suspension and the extracted suspension are mixed within the recirculation line 89 and this mixture is sprayed from the spray nozzle 73 onto the foaming layer 88. In this manner, the sludge suspension to be ozonized is supplied to the ozonization vessel 31, while adjusting the height of the foaming layer 88 so as to maintain the thickness of the foaming contacting zone 87 at a predetermined value.

On the other hand, the ozone or ozone-containing gas is blown into the sludge suspension 85 from the ozone supply line 36, in order to cause the sludge suspension 85 to contact with ozone in the liquid contacting zone 86 to effect an oxidative decomposition of the sludge and to foam the sludge suspension, so as to build up a foam layer 88 in the foam contact zone 87. The ozone or ozone-containing gas rising up through the foam contacting zone 87 contacts with the sludge particles existing within the liquid film of the bubble to cause the sludge to decompose. The ozone-containing gas blown into the liquid contacting zone 86 causes the sludge suspension to foam while reacting with the sludge particles therein and rises up then further into the foam layer 88 to cause a further reaction with the sludge particles, wherein the sludge-containing liquid building up the foam layer 88 will return upon collapse of the bubbles to the liquid contacting zone 86 and such procedures are repeated. Due to the large liquid surface area in the layer 88, the gas/liquid contacting efficiency is high, so that the ozone treatment efficiency is higher as compared with the case without incorporation of foaming. Due to the lower weight of the foam layer 88, the structural strength of the ozonization vessel 31 can be chosen to be low.

The spent ozone-containing gas from the foam contacting zone 87 is discharged out of the vessel via the gas discharge line 34. A part of the sludge suspension 85 is exhausted out of the vessel from the sludge suspension delivery line 94 as the ozonized treated liquor. Because the syphon breaker 93 opens to the atmosphere, the sludge suspension 85 in the ozonization vessel is discharged in the manner of over-flow, whereby the liquid level of the liquid contacting zone 86 is maintained constant.

By supplying the sludge suspension to be treated to the ozonization vessel 31 and contacting it with an ozone-containing gas in counter-flow contact, a higher contacting efficiency is attained as compared with parallel-flow contact, so that the ozone treatment can be realized more efficiently.

It is also possible to connect the sludge suspension supply line 92 directly to the ozonization vessel 31 at its upper portion or above the liquid contacting zone 86, instead of connecting it to the recirculation line 89.

In the embodiment of FIG. 13, the sludge suspension to be treated is introduced into the ozonization vessel at a position beneath the liquid contacting zone 86 to effect contact thereof with the ozone-containing gas in parallel-flow and the ozonized liquor is extracted from the vessel at its lower portion to recirculate the sludge suspension 85 in the vessel. Other operations were essentially the same as in the embodiment of FIG. 12.

In the embodiment of FIG. 14, the operations were essentially the same as in the embodiment of FIG. 12. However, due to the incorporation of a honeycomb type foam layer supporting element 95 within the foam contacting zone 87, a better foam contact is attained even for a sludge suspension exhibiting inferior foaming performance, since a constant depth of the formed layer 88 is maintained by the aid of the foam layer support element 95. Therefore, the ozone treatment can be realized efficiently.

Below, the invention will further be described by way of Examples, wherein % values are given on the weight basis, if not specially mentioned.

Comparative Example 1

An aerobic biological treatment of an aqueous organic waste was carried out using an artificial waste water containing peptone and yeast extract in an amount of 500 mg/l in the aeration tank of the apparatus as shown in FIG. 5 at a BOD load of 1 kg per cubic meter per day, an SS load of 0.25 kg of BOD per kg of SS per day at pH 7.0. The rate of production of excess sludge amounted to 0.4 g-SS/g-BOD.

Example 1

An aqueous organic waste similar to that of Comparative Example 1 was treated in the apparatus as shown in FIG. 5. Here, an ozone treatment was incorporated by introducing the excess sludge to the ozonization vessel after it had been adjusted to a pH of 5 by adding thereto an adequate amount of sulfuric acid. The ozone treatment was carried out at an ozone dose of 0.05 g-$O_3$/gVSS. The ozonized liquor was recirculated to the aeration tank and subjected to an aerobic biological treatment. The apparent rate of formation of excess sludge amounted to 0.3 g-SS/g-BOD.

Example 2

The procedures of Example 1 were repeated except that the ozone dose was 0.03 g-$O_3$/g-VSS, whereby, nevertheless, the apparent rate of formation of excess sludge was unchanged at the value of 0.3 g-SS/g-BOD.

Comparative Example 2

The procedures of Example 1 were repeated except that the ozone treatment was carried out with the excess sludge at pH 7 without incorporating pH control. Here, the apparent rate of formation of excess sludge was raised to 0.4 g-SS/g-BOD which is the same as in the Comparative Example 1, so that no effect of ozone treatment was recognized.

Comparative Example 3

The procedures of Comparative Example 2 were repeated except that the ozone dose was increased to 0.1 g-$O_3$/g-VSS, resulting in an apparent rate of formation of excess sludge of 0.3 g-SS/g-BOD, which was the same as that of Example 1.

From the results of Examples 1 and 2 and Comparative Examples 2 and 3, it is seen that the requisite amount of ozone can be reduced by incorporating an ozone treatment carried out at pH 5, to about ⅓ of that of the operation in which the ozone treatment is carried out at pH 7.

Example 3

The aerobic biological treatment was carried out as in Comparative Example 1 and the thereby formed excess sludge (pH 7) was adjusted to a pH in the range of 3-9 by adding thereto varying amount of sulfuric acid or sodium hydroxide. Using these pH-adjusted excess sludges, ozone treatment was carried out at various values of ozone doses (g-$O_3$/g-VSS) and the proportion of [BOD transformed (g)]/[sludge treated (g)], namely, the rate of BOD transformation was determined. The results are recited in the graph of FIG. 16. From FIG. 16, the minimum ozone dose (g-$O_3$/g-VSS) required for sufficient transformation into BOD was calculated. Results are given in the graph of FIG. 17.

Figure 17:
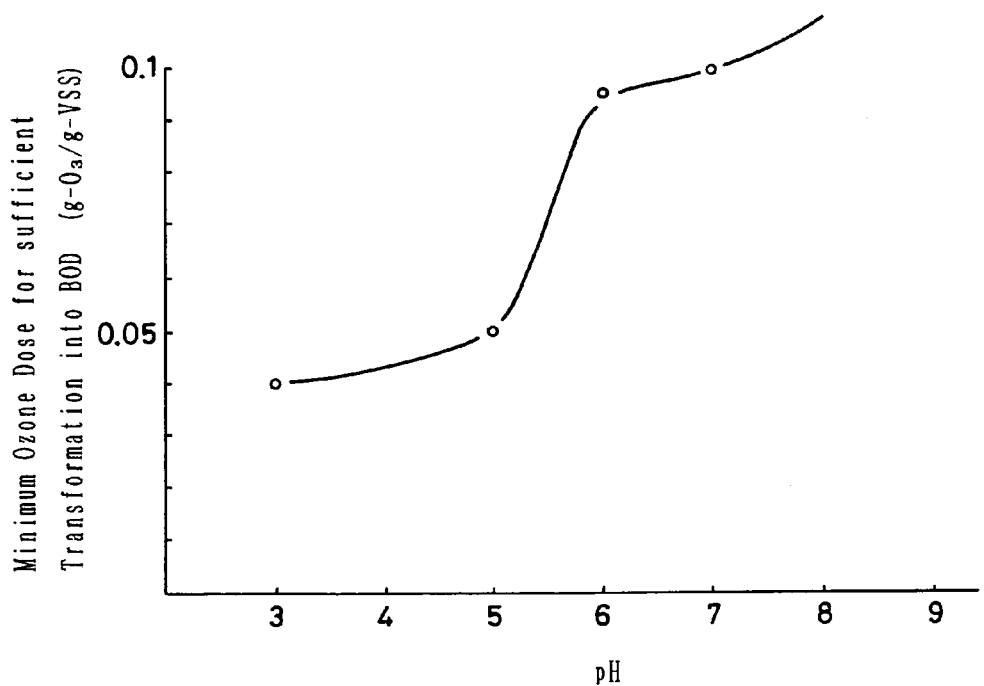

From the graphs of FIGS. 16 and 17, it is seen that the required amount of ozone can be considerably reduced by incorporating an ozone treatment at a pH of 5 or below, as compared with the case where the ozone treatment is effected at around pH 7 or without pH-adjustment.

Example 4

The aerobic biological treatment was carried out using a presedimented sewage by the apparatus as shown in FIG. 6 under the condition given below.

The results are summarized in Table 2.

| Condition | |
|---|---|
| Sewage Quality | |
| BOD | 105 mg/l |
| Inorganic SS | 18 mg/l |
| Sewage treating rate | 300 l/day |
| Aeration Tank HRT | 8 hours |
| pH on Ozone Treatment | 3 |
| Ozone Treatment Duration | 10 min. (per Volume of the Sewage) |
| Ozone dose | 0.02 g-$O_3$/g-VSS |
| Recirculation Rate of Extr. Sludge to the Vessel | 2% of the Suspension to be Treated |

The moisture content of the dewatered sludge cake was determined in the following manner:

200 ml of the sedimented sludge were taken in a 300 ml beaker, to which was added an aqueous solution of a homopolymer of dimethylaminoethyl acrylate quaternized with methyl chloride, the concentration of which was adjusted at 0.2%, in such an amount that the concentration of the homopolymer was 1%, based on the SS of the sludge suspension, whereupon the resulting mixture was agitated for 30 seconds using a stirrer equipped with turbine blades at a rotation rate of 200 rpm. The agitated sludge suspension was poured into a Buchner funnel covered by a nylon filter cloth and having inserted therein a short polyvinyl chloride pipe of an inner diameter of 5 cm to effect filtration of the sludge suspension. The filtered sludge was placed on a filter cloth for a belt press filter and squeezed under a surface pressure of 0.5 kgf/$cm^2$ for 1 minute, whereupon the moisture content of the so-dewatered filter cake was determined.

Comparison Example 4

The procedures of Example 4 were repeated except that the ozone treatment was omitted. The results are summarized in Table 2.

TABLE 2

| | Example 4 | Comp. Example 4 |
|---|---|---|
| Treated liquor BOD (mg/l) | 12 | 10 |
| Treated liquor SS (mg/l) | 15 | 16 |
| VSS/SS Ratio | 0.38 | 0.80 |
| MLVSS | 1500 | 1700 |
| SVI | 78 | 155 |
| Biosludge formed (g-DS/day) | 6.6 | 21 |
| $H_2O$ % in dewatered cake | 67 | 75 |

From Table 2, it is seen that the sludge of Example 4 exhibits better sedimentation properties and superior dewatering performance as compared with that of Comparative Example 4. It is also seen that a reduction of excess sludge is attained without deterioration in the treated water quality.

Example 5, Comparative Examples 5-7

Using an artificial organic waste water containing peptone and yeast extract as the main organic components (BOD=340 mg/l), an aerobic biological treatment was carried out with the apparatus of FIG. 7 under the condition given in Table 3 below. In Comparative Example 5, the biological treatment was carried out without incorporating either anaerobic biological treatment or ozone treatment. In Comparative Example 6, ozone treatment of the extracted sludge was incorporated without pH adjustment and without anaerobic biological treatment. In Comparative Example 7, only anaerobic biological treatment of the extracted sludge was incorporated without ozone treatment. Results are given in Table 3.

TABLE 3

|  | Example 5 | Comp. Exam. 5 | Comp. Exam. 6 | Comp. Exam. 7 |
|---|---|---|---|---|
| Asidogenesis R.T.[1] (hr) | 12 | — | — | 12 |
| pH | 5 | — | 7 | — |
| BOD tank load (kg BOD/m$^3$ · d) | 1 | 1 | 1 | 1 |
| Ozone dose (g O$_3$/g VSS) | 0.02 | — | 0.05 | — |
| Excess sludge (g SS/g BOD) | 0 | 0.39 | 0 | 0.36 |
| MLSS (mg/l) | 3300 | 3400 | 3500 | 3300 |
| Treated liquor BOD (mg/l) | below 5 | below 5 | below 5 | below 5 |
| Treated Liquor SS (mg/l) | 13 | 10 | 12 | 12 |

[1]Retention time

From Table 3, it is seen that the requisite amount of ozone in Example 5 can be reduced by an amount of 60% as compared with that in Comparative Example 6.

Comparative Example 8

A waste water from a food manufacturing factory having BOD=1,000 mg/l and SS=100 mg/l was subjected to an aerobic biological treatment with the apparatus as shown in FIG. 8. Here, no ozone treatment nor heat treatment was incorporated. The biological treatment was carried out using an aeration tank of 1 m$^3$ capacity at a BOD volumetric load of 1 kg BOD/m$^3$ and a BOD sludge load of 0.2 kg BOD/kg MLSS/day. A treated water having a COD$_{Mn}$ of 20 mg/l was obtained and the rate of removal of excess sludge amount to 0.4 kg/day.

Comparative Example 9

The procedures of Comparative Example 8 were repeated using the same food industry waste water used with the apparatus of FIG. 8 without incorporating heat treatment. The sludge extracted at a rate of 0.4 kg per day was subjected to an ozone treatment by ozone in an amount of 2%, based on the weight of the extracted sludge, at pH 7 (amount of ozone consumption=8 g/day). The amount of excess sludge exhausted for maintaining the sludge load at the same level as in Example 8 was 0.26 kg/day. A treated water having a COD$_{Mn}$ of 24 mg/l was obtained.

Comparative Example 10

The procedures of Comparative Example 9 were repeated except that the amount of ozone consumption was changed to 1%, based on the weight of the extracted sludge (4 g of ozone per day). The amount of excess sludge removed out of the system for maintaining the sludge load at the same level as in Comparative Example 8 amounted to 0.38 kg/day and the effect of excess sludge reduction was low. A treated water having a COD of 22 mg/l was obtained.

Example 6

The food industry waste water of Comparative Example 8 was biologically treated with the apparatus of FIG. 8. The ozone treatment was carried out for the extracted sludge after it had been adjusted to pH 5 by adding an adequate amount of sulfuric acid at an ozone dose of 0.5%, based on the weight of the extracted sludge, and 0.4 kg/day of the extracted sludge was ozone-treated (4 g of ozone per day). After the ozone treatment, the sludge suspension was heat-treated at 80° C. for 1 hour. The amount of excess sludge removed out of the system for maintaining the sludge load at the same level as that of the Comparative Example 8 was 0.26 kg/day. A treated water having a COD$_{Mn}$ of 22 mg/l was obtained.

In this Example in which the ozone consumption was controlled at 0.5% by weight, a reduction of an excess sludge amount comparable to that of Comparative Example 9 in which the amount of ozone consumption was maintained at 2% by weight was observed.

Example 7

The food industry waste water of Comparative Example 8 was biologically treated with the apparatus of FIG. 8. The ozone treatment was carried out for the extracted sludge after it had been adjusted to pH 5 by the addition of sulfuric acid, by using ozone in an amount of 0.5%, based on the weight of the extracted sludge, and 0.8 kg/day of the extracted sludge was ozone-treated (8 g of ozone per day). After the ozone treatment, the sludge suspension was heat-treated at 60° C. for 1 hour. The amount of excess sludge exhausted out of the system for maintaining the sludge load at the same level as that of the Comparative Example 8 was 0.10 kg/day. A treated water having a COD$_{Mn}$ of 25 mg/l was obtained.

Example 8

Excrement having a COD$_{Mn}$ of 5,500 mg/l was biologically treated with the apparatus of FIG. 9.

The treatment was carried out under the condition of a raw waste supply rate of 1 m$^3$/day, an aeration tank capacity of 4 m$^3$, an MLSS of 15,000 mg/l, a rate of supply of sludge suspension to the membrane separator of 20 m$^3$/day, a rate of recirculation of the sludge concentrate of 18.7 m$^3$/day, a water permeation rate in the membrane separator of 1 m$^3$/day, a rate of ozonization of sludge concentrate of 0.3 m$^3$/day and an ozone dose of 0.03 g O$_3$/g VSS. The sludge concentrate to be ozonized was subjected to a pH control by adding sulfuric acid to adjust the pH thereof to 5.

The membrane separator was constituted of a flat film module assembly in which flat film modules (0.1 m$^2$×10 sheets) of UF membrane of a polysulfone having a fractional molecular weight of 2,000,000 each being constructed so as to permit adjustment of the separation surface area between 0.1 and 1 m$^2$. The separation was effected at an operation pressure of 3 kgf/cm$^2$.

A permeated treated water having a COD$_{Mn}$ of 140 mg/l was obtained at a permeation flux of the membrane separator of 2 m$^3$/m$^2$·day with zero amount of excess sludge formation.

Comparative Example 11

The procedures of Example 8 were repeated except that the ozone supply was omitted. A treated water having a $COD_{Mn}$ of 140 mg/l was obtained at a permeation flux of 1 m³/m²·day. The amount of excess sludge formed was 5.5 kg SS/day.

Example 9

An urban sewage sludge having a sludge concentration of 10,000 mg/l and a pH of 5 was ozone-treated in an ozonization vessel as shown in FIG. 11 having an inner diameter of 100 mm and a height of 5,000 mm at a flow rate (SV; this applies hereafter) of 2 hr⁻¹.

In the ozone treatment, the sludge suspension was contacted with an ozone-containing gas having an ozone concentration of 20 mg/l in counter-flow contact, while recirculating the sludge suspension in the ozonization vessel by removing it at a position of 1 m beneath the top of the vessel and spraying it onto the liquid surface in the vessel by a pump. The flow rate of the ozone-containing gas at the point of time at which the amount of ozone consumption reached a value of 0.03 g $O_3$/g VSS was 0.75 min⁻¹. This indicates that the spent ozone-containing gas was discharged out of the system at a flow rate of 0.25 min⁻¹.

Example 10

The procedures of Example 9 were repeated except that the ozonization was carried out by parallel-flow gas/liquid contact. The flow rate of the ozone-containing gas at the point of time at which the ozone consumption rate reached 0.03 g $O_3$/g VSS was 0.9 min⁻¹.

Comparative Example 12

The ozone treatment of Example 9 was carried out while excluding the spraying of the ozonization vessel. Sedimentation of the sludge particles was observed and it was necessary to increase the flow rate of the ozone-containing gas up to 1 min⁻¹ for attaining an ozone consumption of 0.03 g $O_3$/g VSS. This indicates that the spent ozone-containing gas was discharged out of the system as a waste gas at a flow rate of 0.5 min⁻¹. It was recognized here, that the tendency to causing foaming of the ozonized sludge suspension became intense when the gas flow rate exceeded 0.5-0.6 min⁻¹, so that it was necessary to reserve a vacant space of 2 m height inside the vessel top, in order to prevent over-flow of the foam liquid into the gas discharge line.

Comparative Example 13

When, in the procedures of Example 9, an urban sewage sludge suspension was used as the spray liquor for suppressing foaming of the ozonized liquor, instead of using the sludge suspension in the ozonizing vessel therefor, successive operation was not possible due to the blocking of the spray nozzle.

Example 11

The ozone treatment of Example 9 was followed except that an excrement sludge suspension having a sludge concentration of 10,000 mg/l and a pH of 5 was employed as the sludge suspension to be ozonized, a parallel-flow contact was chosen and the location of the removal of the sludge suspension in the ozonization vessel for its circulation was changed to a position 1 meter above the bottom of the vessel. The flow rate of the ozone-containing gas at the point in time at which the ozone consumption rate reached 0.03 g $O_3$/g VSS was 0.75 min⁻¹.

Example 12

The same procedures as in Example 11 were followed, except that the location of the removal of the sludge suspension in the ozonization vessel for its circulation was changed to the position 2 meters above the bottom of the vessel. The flow rate of the ozone-containing gas at the point of time at which the ozone consumption rate reached 0.03 g $O_3$/g VSS was 1 min⁻¹.

Example 13

The same procedures as in Example 11 were followed, except that the location of the removal of the sludge suspension in the ozonization vessel for its circulation was changed to a position 3 meters above the bottom of the vessel. The flow rate of the ozone-containing gas at the point of time at which the ozone consumption rate reached 0.03 g $O_3$/g VSS was 1.4 min⁻¹.

Comparative Example 14

When, in the procedures of Example 11, an excrement sludge suspension which had not been subjected to ozone treatment was used as the spray liquor for suppressing foaming of the ozonized liquor, instead of using the sludge suspension in the ozonization vessel therefor, successive operation was not possible due to blocking of the spray nozzle.

Comparative Example 15

When, in the procedures of Example 11, the ozone treatment was effected without employing spraying of liquor onto the surface of the ozonized liquor, the sludge particles floated up on the liquid surface, foaming a scum layer and causing a flooding of the foam layer into the gas discharge line, and, thus, interruption of the operation was necessary.

Comparative Example 16

It was permissible to proceed with the operation of Comparative Example 15, when an antifoaming agent was used. However, it was necessary to increase the flow rate of the ozone-containing gas up to 2 min⁻¹, in order to attain an ozone consumption rate of 0.03 g-$O_3$/g-VSS.

Comparative Example 17

When, in Comparative Example 15, tap water was used for suppressing the foaming of the ozonized suspension, it was necessary to increase the flow rate of the ozone-containing gas up to 1.5 min⁻¹, in order to attain an ozone consumption rate of 0.03 g $O_3$/g VSS.

Example 14

Ozone treatment of an sludge suspension containing activated sludge was effected using the ozone treating unit as shown in FIG. 12 by maintaining a foam layer depth in the range of 0-2.0 meters and a liquid depth in the ozonization vessel in the range of 4.0-2.0 meters by blowing an ozone-containing gas thereinto under the following conditions:

| pH of the liquor to be ozonized | 5 |
|---|---|
| Activated sludge conc. therein | 7,000 mg/l |
| Flow rate of the liquor to be treated | 100 ml/min |
| Ozone concentration | 20 mg/l |
| Flow rate of ozone-containing gas | 1,000-18,000 ml/min |
| Spraying flow rate | 600 ml/min |
| Inner diameter of ozonization vessel | 10 cm |
| Total height of ozonization vessel | 4.3 m |

Figure 18:
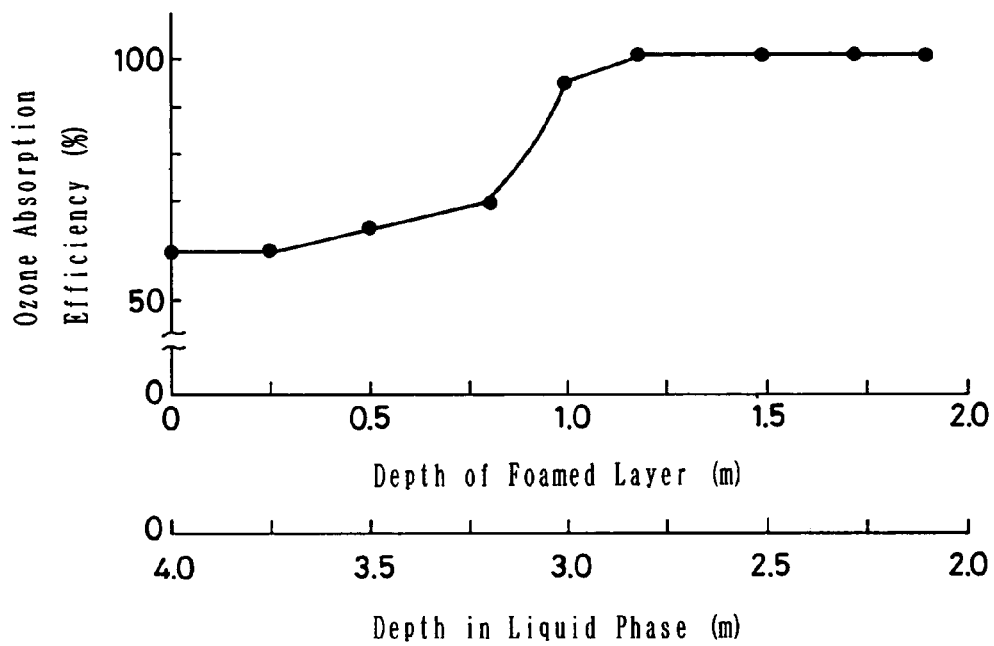
FIG. 18 is a graph representing the experimental results of Example 14.

Results are recited in the graph of FIG. 18. From the graph of FIG. 18, it is seen that the ozone absorption efficiency increases greatly, as high as 90% or more, when the foam layer depth exceeds over 1 meter, whereby the ozonization is attained efficiently.

Example 15

Ozone treatment of various sludge suspensions containing activated sludge in different levels was effected by the ozone treating unit as shown in FIG. 13 by blowing an ozone-containing gas thereinto under the following conditions:

| pH of the liquor to be ozonized | 5 |
|---|---|
| Activated sludge conc. therein | 1,000-7,000 mg/l |
| Flow rate of the liquor to be treated | 100 ml/min |
| Ozone concentration | 20 mg/l |
| Flow rate of ozone-containing gas | 1,100 ml/min |
| Spraying flow rate (for act. sludge conc. over 2,000 mg/l only) | 1,000 ml/min |
| Inner diameter of ozonization vessel | 10 cm |
| Total height of ozonization vessel | 4.3 m |
| Height of foam layer | 0-4 m |

Figure 19:
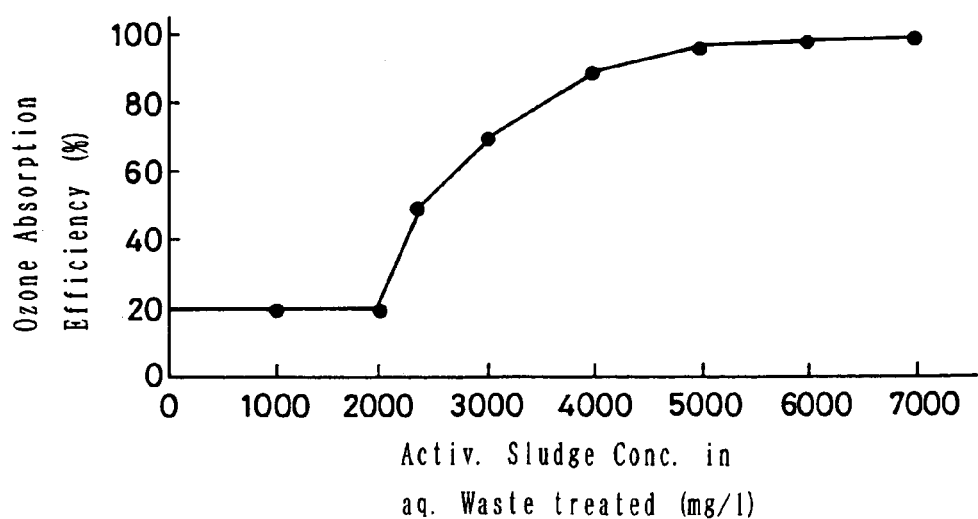
FIG. 19 is a graph representing the experimental results of Example 15.

Results are recited in the graph of FIG. 19. As seen from FIG. 19, the ozone absorption efficiency increases in proportion to the activated sludge concentration when an activated sludge concentration of 2,000 mg/l is exceeded. The concentration of the activated sludge is also proportional to the height of the foam layer and it amounts to over 1 meter at an activated sludge concentration of 4,000 mg/l and increases to 4 m at a concentration of 7,000 mg/l.

Example 16

Ozone treatment of a sludge suspension containing activated sludge was effected using the ozone treating unit as shown in FIG. 14 by blowing an ozone-containing gas thereinto under the conditions given below. A honeycomb partition with a honeycomb pitch of 20 cm was employed as a foam layer support element.

| pH of the liquor to be ozonized | 5 |
|---|---|
| Activated sludge conc. therein | 7,000 mg/l |
| Flow rate of the liquor to be treated ozonized | 10 liter/min |
| Ozone concentration | 20 mg/l |
| Flow rate of ozone-containing gas | 120 liter/mm |
| Spraying flow rate | 20 liter/mm |
| Inner diameter of ozonization vessel | 100 cm |
| Total height of ozonization vessel | 4 m |

The height of the foam layer amounted to 2 meters from the liquid surface of the ozonization vessel, at which the ozone absorption efficiency reached 90%.

Example 17

The operation of Example 16 was repeated except that a honeycomb partition with a honeycomb pitch of 10 cm was used instead of the honeycomb partition of 20 cm pitch. The height of the foam layer was increased to 3 meters from the liquid surface of the ozonizing vessel, at which the ozone absorption efficiency reached 99%.

Comparative Example 18

Ozone treatment of Example 16 was repeated with the exception of not using the partition. The foam layer depth attained was only about 0.5 meter and the ozone absorption efficiency was 80%.

As described above, it is possible according to the present invention to carry out biological treatment of aqueous organic wastes with an efficient transformation of biosludge into BOD components with scarce consumption of ozone, since the ozone treatment of the biosludge is effected after the pH of the biosludge has been adjusted to 5 or lower, whereby an efficient reduction of the biosludge amount can be realized and even zero formation of excess sludge may occasionally be achieved.

When a heat treatment of the biosludge at a temperature of 50-100° C. is incorporated before and/or after the ozone treatment according to the present invention, the sludge can be decomposed with a smaller amount of ozone, attaining a higher biodegradability, whereby a more efficient reduction of the biosludge may be achieved.

When, according to the present invention, the VSS/SS ratio and the MLVSS value are maintained at each predetermined value by controlling the amount of biosludge supplied to the ozone treatment and the amount of excess sludge exhausted out of the system, the sedimentation property and the dewatering performance of the sludge can be improved.

When, according to the present invention, the separation of the sludge and the aqueous phase of the sludge suspension in the aeration tank is carried out using a membrane separator to yield the permeated water and the sludge concentrate and a part of the sludge suspension in the aeration tank or at least a part of the separated concentrate is subjected to an ozone treatment and the so-ozonized liquor is recycled to the aeration tank, the membrane separation can be realized under exclusion of stuffing or blocking of the membrane at a high permeation flux with simultaneous attainment of the reduction of excess sludge formation and even, in some cases, a zero formation of excess sludge, without any decrease in the load and treatment performance.

When, according to the present invention, the ozonized sludge suspension in the ozonization vessel is used for suppressing the foaming of the ozonized suspension by spraying it onto the liquid surface of the ozonization vessel, the ozone treatment can be realized efficiently in a compact and small-sized unit while preventing the foaming trouble effectively without blocking of the spray nozzle.

When, according to the present invention, a foam contacting zone is built up above the liquid contacting zone in the ozonization vessel for the contact of ozone with the sludge, by blowing an ozone-containing gas into the liquid contacting zone in the ozonization vessel, an efficient contact of the biosludge with ozone can be realized using an ozonization vessel having a lower structural strength, whereby the ozone treatment can be performed efficiently at a low cost.

When, according to the present invention, a foam layer supporting element is incorporated in the foam contacting zone, the foam layer can be maintained efficiently, whereby the biosludge can be ozonized efficiently at a low cost, even if the sludge suspension employed is difficult to foam or the foam layer is difficult to maintain.

The invention claimed is:

1. A process for aerobic biological treatment of an aqueous organic waste comprising the steps of:
   introducing the aqueous organic waste into an aeration tank;
   aerating the aqueous organic waste in the aeration tank in the presence of a biosludge comprising aerobic microorganisms to form an aerated aqueous suspension in which biosludge is grown from the aqueous organic waste and biosludge is lost by autolysis;
   withdrawing aerated aqueous suspension from the aeration tank and introducing the withdrawn aerated aqueous suspension into a solid/liquid separation unit;
   subjecting the aerated aqueous suspension in the solid/liquid separation unit to solid/liquid separation to form a separated sludge and a separated liquid phase;
   discharging the separated liquid phase from the process as treated water;
   recycling at least a portion of the separated sludge back to the aeration tank;
   extracting a part of the aerated aqueous suspension from the aeration tank or another portion of the separated sludge;
   ozonizing either the extracted part of aerated aqueous suspension or the extracted another portion of the separated sludge in an ozonization vessel to ozonize and convert biosludge contained in the extracted part of aerated aqueous suspension or the extracted another portion of the separated sludge into BOD components, the ozonizing taking place at a pH of 5 or lower; and
   recycling either the ozonized part of aerated aqueous suspension or the ozonized portion of the separated sludge back to the aeration tank for aerobic biological treatment, wherein the amount of biosludge ozonized and converted into BOD components is greater than the difference between the amount of biosludge grown in the aeration tank and the amount of biosludge lost by autolysis.

2. A process according to claim 1, wherein the ozonizing step is performed at the pH of 5 or lower by an addition of a pH controlling agent.

3. A process according to claim 1, wherein the process further comprises, prior to the step of ozonizing, a step of acidogenesis in which the extracted part of the aerated aqueous suspension or the extracted another portion of the separated sludge is subjected to an anaerobic biological treatment to adjust the pH thereof to a value of 5 or lower.

4. A process according to claim 1, wherein the process further comprises a step of heating the extracted part of the aqueous suspension or the extracted another portion of the separated sludge to a temperature between 50 and 100° C. before or after the ozonizing step.

5. A process according to claim 1, wherein the biosludge in the aeration tank has a VSS/SS ratio maintained at a value of 0.2-0.7 and a MLVSS value maintained of 500-10000 mg/l.

6. The process according to claim 1, wherein the extracted part of the aerated aqueous suspension is ozonized.

7. A process for aerobic biological treatment of an aqueous organic waste comprising the steps of:
   introducing the aqueous organic waste into an aeration tank;
   aerating the aqueous organic waste in the aeration tank in the presence of a biosludge comprising aerobic microorganisms to form an aerated aqueous suspension in which biosludge is grown from the aqueous organic waste and biosludge is lost by autolysis;
   withdrawing aerated aqueous suspension from the aeration tank and introducing the withdrawn aerated aqueous suspension into a membrane separation unit;
   subjecting the aerated aqueous suspension in the membrane separation unit to membrane separation to form a permeated liquid and a concentrated sludge;
   discharging the permeated liquid from the process as treated water;
   recycling at least a portion of the concentrated sludge back to the aeration tank;
   extracting a part of the aerated aqueous suspension from the aeration tank or another portion of the separated sludge;
   ozonizing either the extracted part of aerated aqueous suspension or the extracted another portion of the concentrated sludge in an ozonization vessel to ozonize and convert biosludge contained in the extracted part of aerated aqueous suspension or the extracted another portion of the concentrated sludge into BOD components, the ozonizing taking place at a pH of 5 or lower; and
   recycling either the ozonized part of aerated aqueous suspension or the ozonized portion of the concentrated sludge back to the aeration tank for aerobic biological treatment, wherein the amount of biosludge ozonized and converted into BOD components is greater than the difference between the amount of biosludge grown in the aeration tank and the amount of biosludge lost by autolysis.

8. The process according to claim 7, wherein the part of the extracted aerated aqueous suspension is ozonized.

* * * * *